(12) United States Patent
Raj et al.

(10) Patent No.: US 6,628,649 B1
(45) Date of Patent: Sep. 30, 2003

(54) APPARATUS AND METHODS PROVIDING REDUNDANT ROUTING IN A SWITCHED NETWORK DEVICE

(75) Inventors: Alex E. Raj, Westford, MA (US); Rodolphe Figaro, Derry, NH (US); Peter Kline, Toms River, NJ (US); Jeremy Lawrence, Chippendale (AU)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/430,653

(22) Filed: Oct. 29, 1999

(51) Int. Cl.[7] .............................................. H04L 12/56
(52) U.S. Cl. .................................... 370/360; 370/395.1
(58) Field of Search ................................ 370/351, 357, 370/360, 395.1, 389, 469

(56) References Cited

U.S. PATENT DOCUMENTS

| | | | |
|---|---|---|---|
| 5,072,217 A | * 12/1991 | Georgiou et al. | ....... 340/825.79 |
| 5,345,228 A | *  9/1994 | Franaszek et al. | ..... 340/825.79 |
| 5,367,520 A | * 11/1994 | Cordell | |
| 6,151,315 A | * 11/2000 | Ash et al. | .................... 370/352 |
| 6,252,853 B1 | *  6/2001 | Ohno | .......................... 370/242 |
| 6,434,612 B1 | *  8/2002 | Hughes et al. | ............... 709/223 |

OTHER PUBLICATIONS

Cisco Systems, Inc. Internet Web site: "Tag Switching: Uniting Routing and Switching for Scalable, High–Performance Services" (visited/printed Jul. 21, 1999) <http://www.cisco.com/warp/public/cc/cisco/mkt/ios/tag/tagsw_wp.htm>.

(List continued on next page.)

Primary Examiner—Kenneth Vanderpuye
(74) Attorney, Agent, or Firm—Chapin & Huang, LLC; Barry W. Chapin, Esq.

(57) ABSTRACT

The invention provides unique architectures and techniques for routing redundancy in a data switch configured to use label switching. Multiple label switch controllers (LSCs) each operate concurrently but independently of each other to provide routes through a data switching mechanism. Preferred embodiments provide a plurality of LSCs offering MPLS capabilities coupled to a single switch, such as an ATM switch. The similarly configured LSCs each can concurrently support a route for data (e.g., labeled ATM cells) within the data switching mechanism in parallel, thereby providing the ability to support redundant and multiple parallel data networks. The configuration is called a label switch router (LSR). A fully-meshed embodiment allows selected routes to share bandwidth on ports, while a fully parallel embodiment provides separate ports for selected routes. Since each LSC provides parallel routes with the other LSCs in an LSR, a communications between an LSR and a label edge router (LER) can use multipath routing to concurrently distribute data equally across the parallel routes for each destination. Alternatively, unipath routing techniques can select one route for use for each destination from the available routes concurrently offered by each LSC. In the event of a failure of one of the LSCs, multipath routing implementations can exclude transmission of data onto the failed network, while continuing to use the other parallel networks supported by non-failed LSCs in a concurrent manner. Alternatively, if a failure occurs with unipath routing, a new route offered by another LSC can be selected for data transfers. In either case, the LSC that fails does not need to provide state or connection information to the LSCs that operate subsequently to the failure, since they are already configured in parallel to support the same route. Upon an LSC failure, switch resources such as bandwidth that were used by the failed LSC are made available to the remaining non-failed LSCs. The design allows failures are handled gracefully without diminished network capacity or data loss resulting in a highly reliable routing capability provided within connection-based or circuit-switched networks.

33 Claims, 19 Drawing Sheets

OTHER PUBLICATIONS

Cisco Systems, Inc. Internet Web site: "Tag Switching: Empowering the Era of the Internet and Intranets" (visited/printed Jul. 21, 1999) <http://www.cisco.com/warp/public/732/tag/index.html>.

Cisco Systems, Inc. Internet Web site: "Tag Switching Architecture" (visited/printed Jul. 21, 1999) <http://www.cisco.com/warp/public/732/tag/tagsw_ov.htm>.

Internet Engineering Task Force Internet Web site: "Multiprotocol Label Switching (mpls)" (visited/printed Jul. 21, 1999) <http://www.ietf.org/html.charters/mpls-charter.html>.

Internet Engineering Task Force Internet Web site: "A Framework for Multiprotocol Label Switching" (dated Jun. 24, 1999, visited Jul. 21, 1999) <http://www.ietf.org/internet-drafts/draft-ietf-mpls-framework-03.txt>.

* cited by examiner

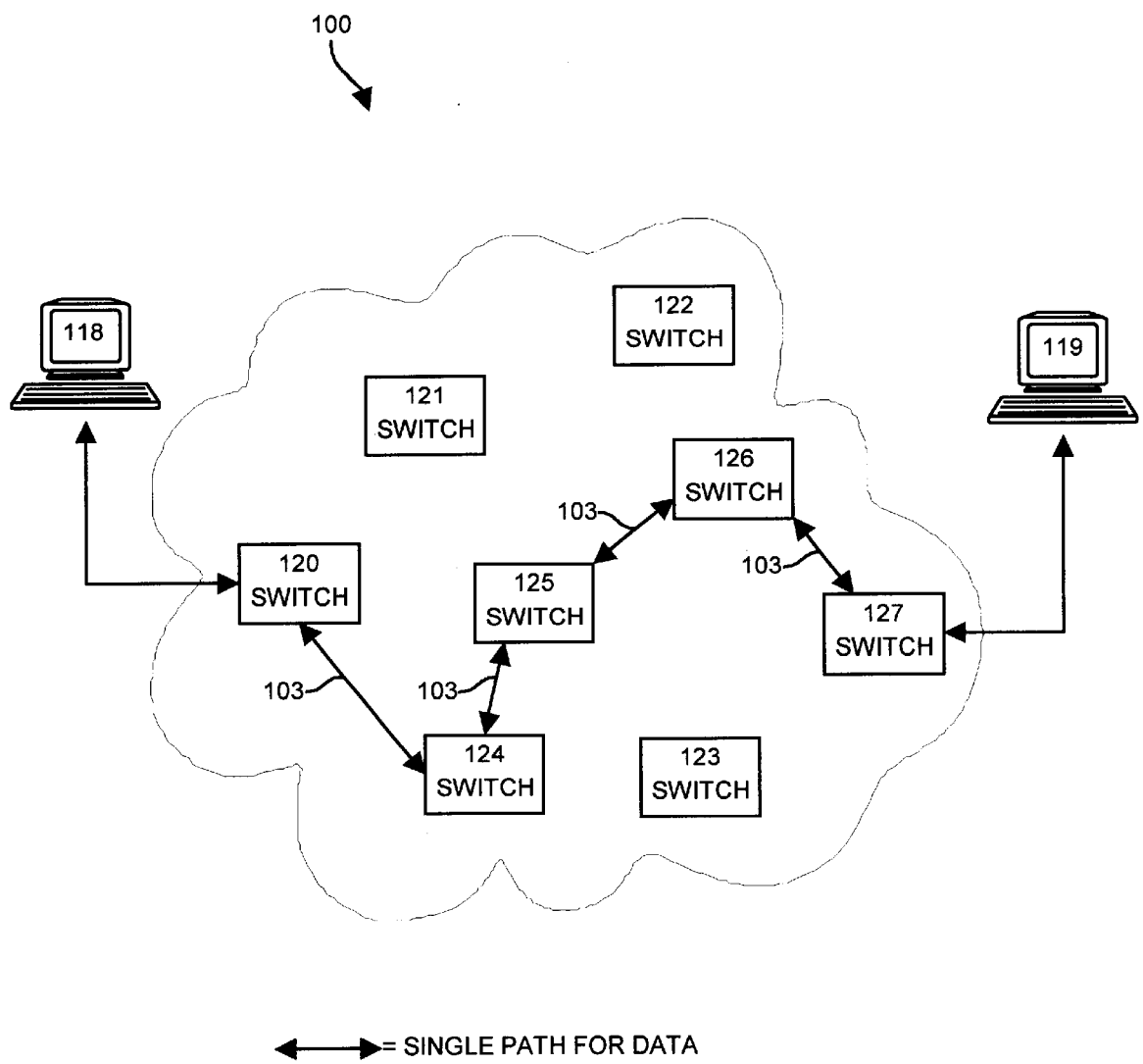
←——▶ = SINGLE PATH FOR DATA
CONNECTION-BASED NETWORK (E.G. CIRCUIT SWITCHED ATM NETWORK, PSTN)
PRIOR ART
FIG. 1

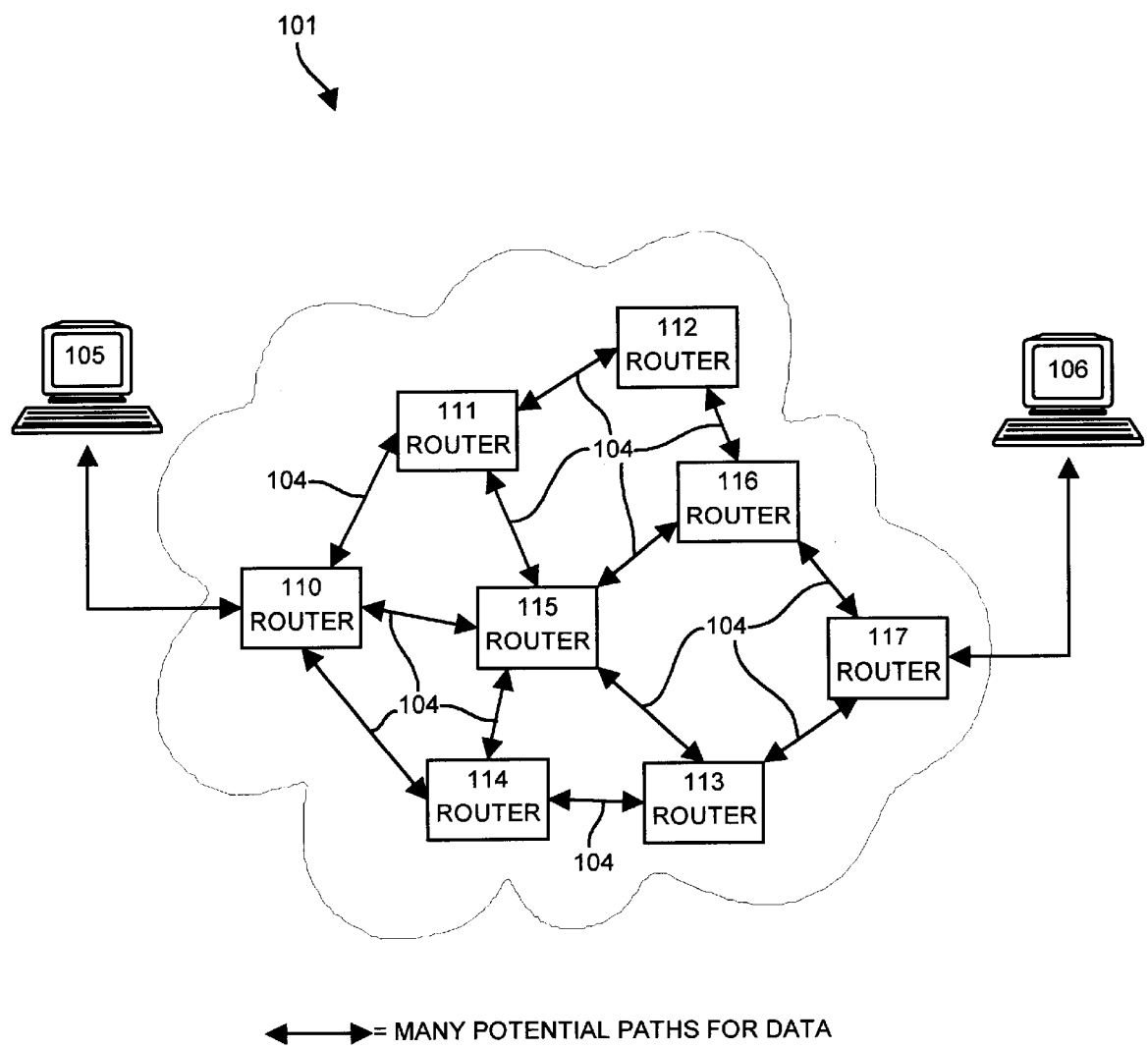
PRIOR ART
FIG. 2

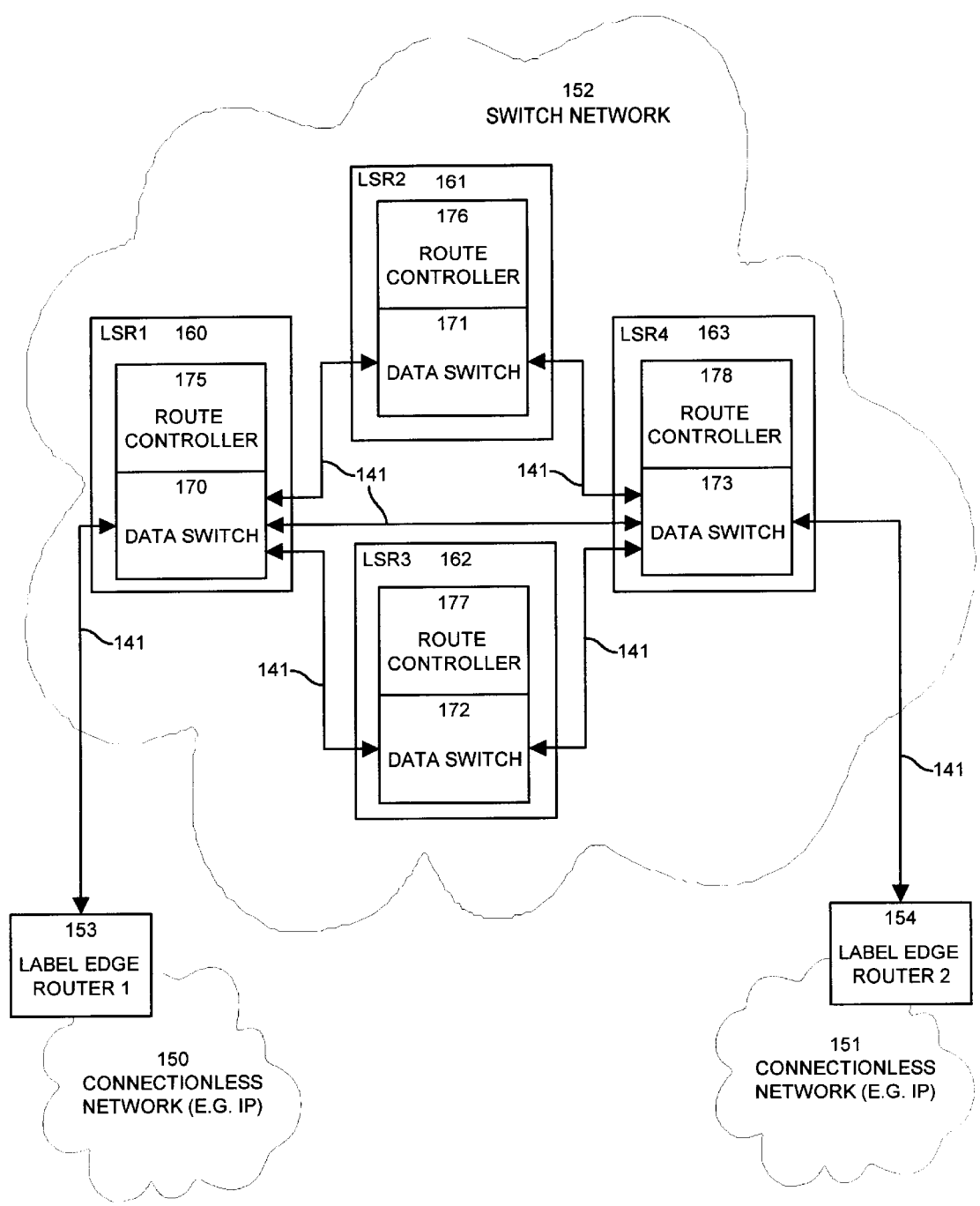
PRIOR ART
FIG. 3

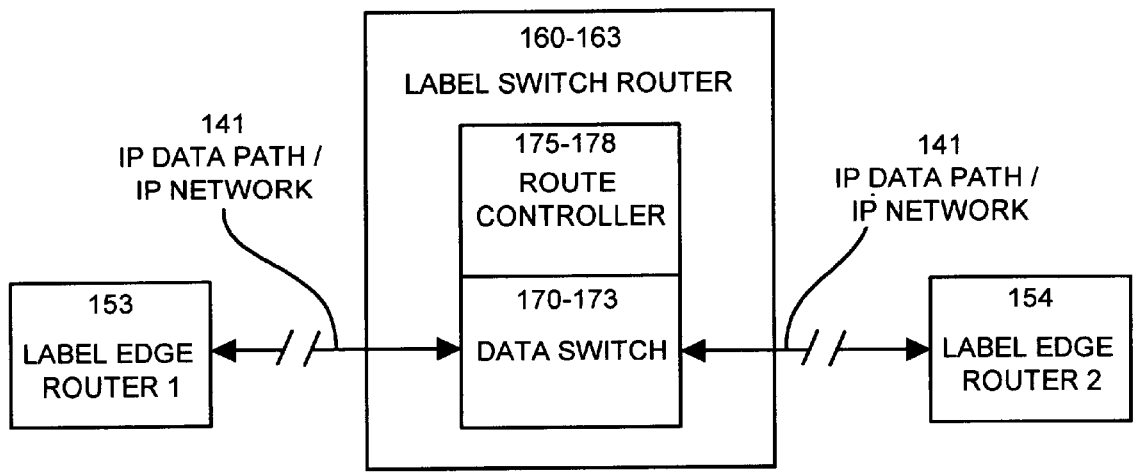
PRIOR ART
FIG. 4

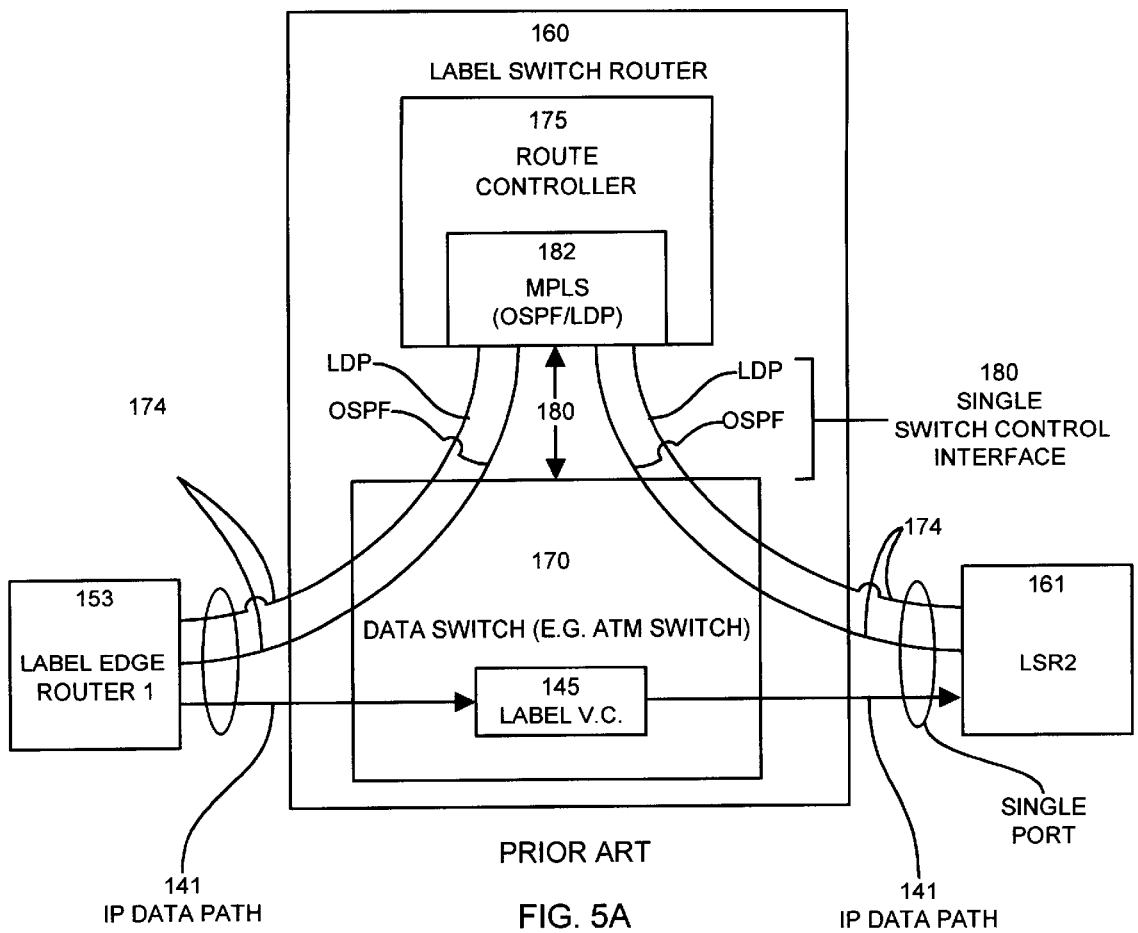
PRIOR ART
FIG. 5A
PRIOR ART
FIG. 5B
PRIOR ART
FIG. 5C

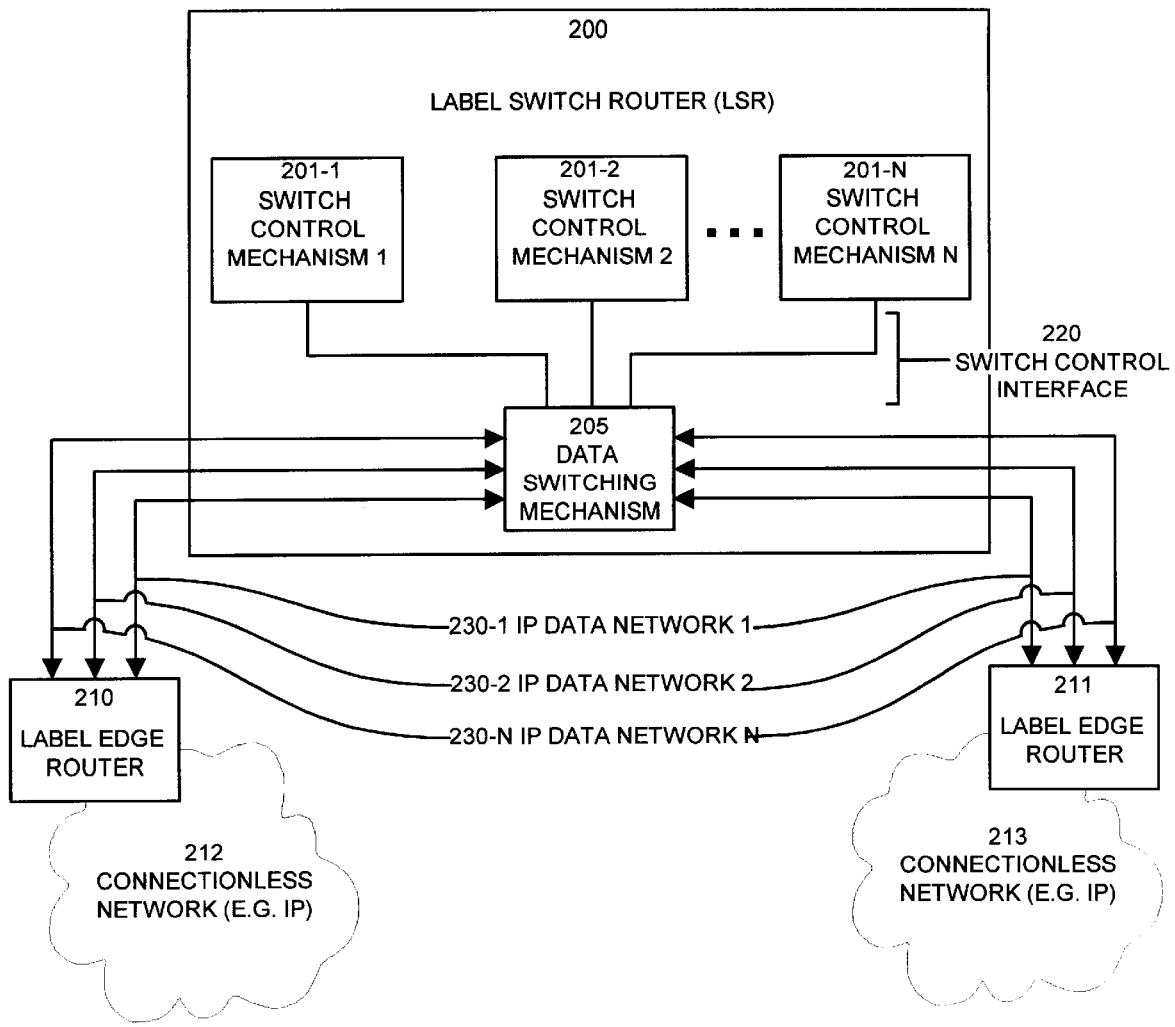
FIG. 6

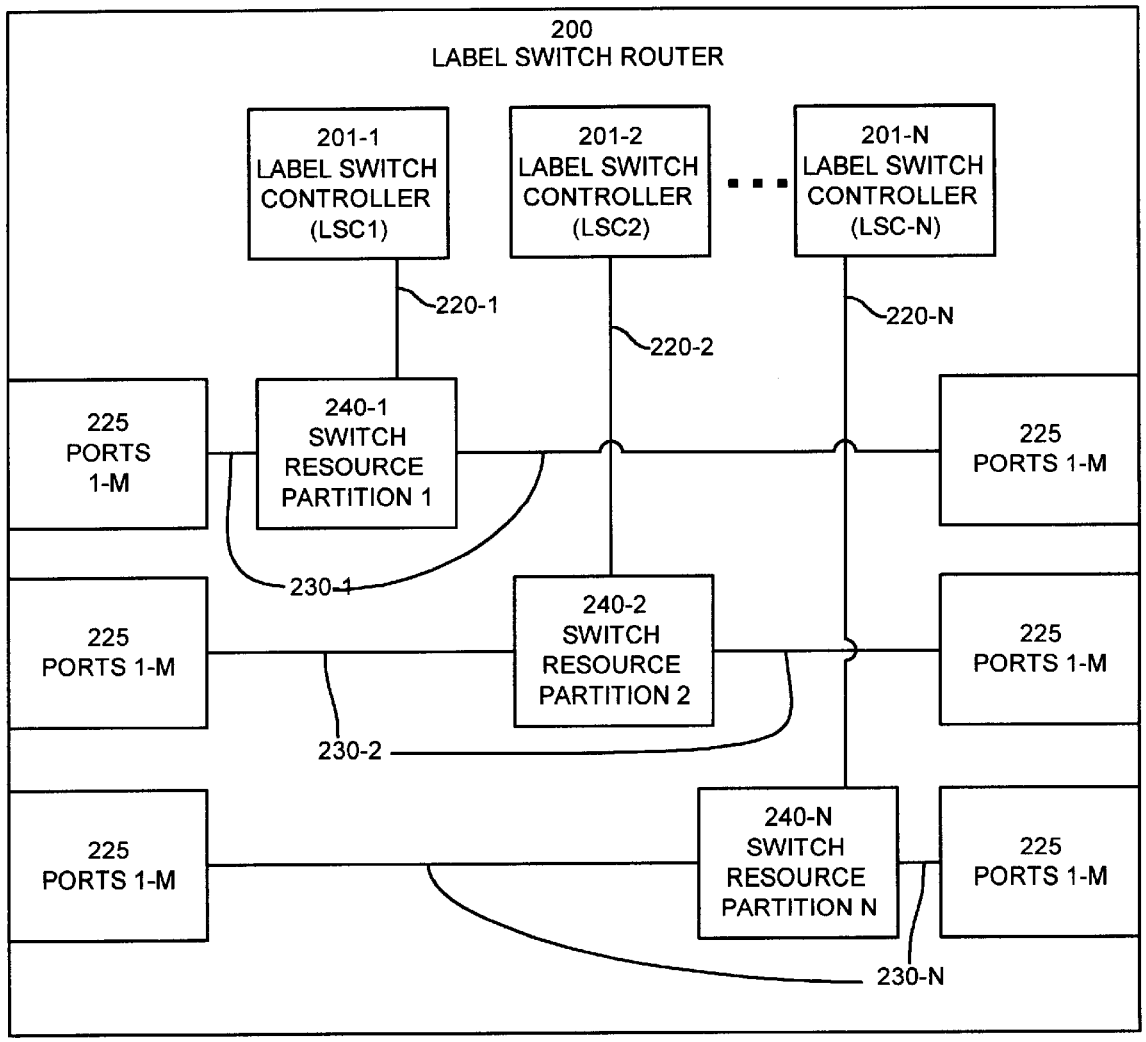
LSR FULLY MESHED ARCHITECTURE
FIG. 7

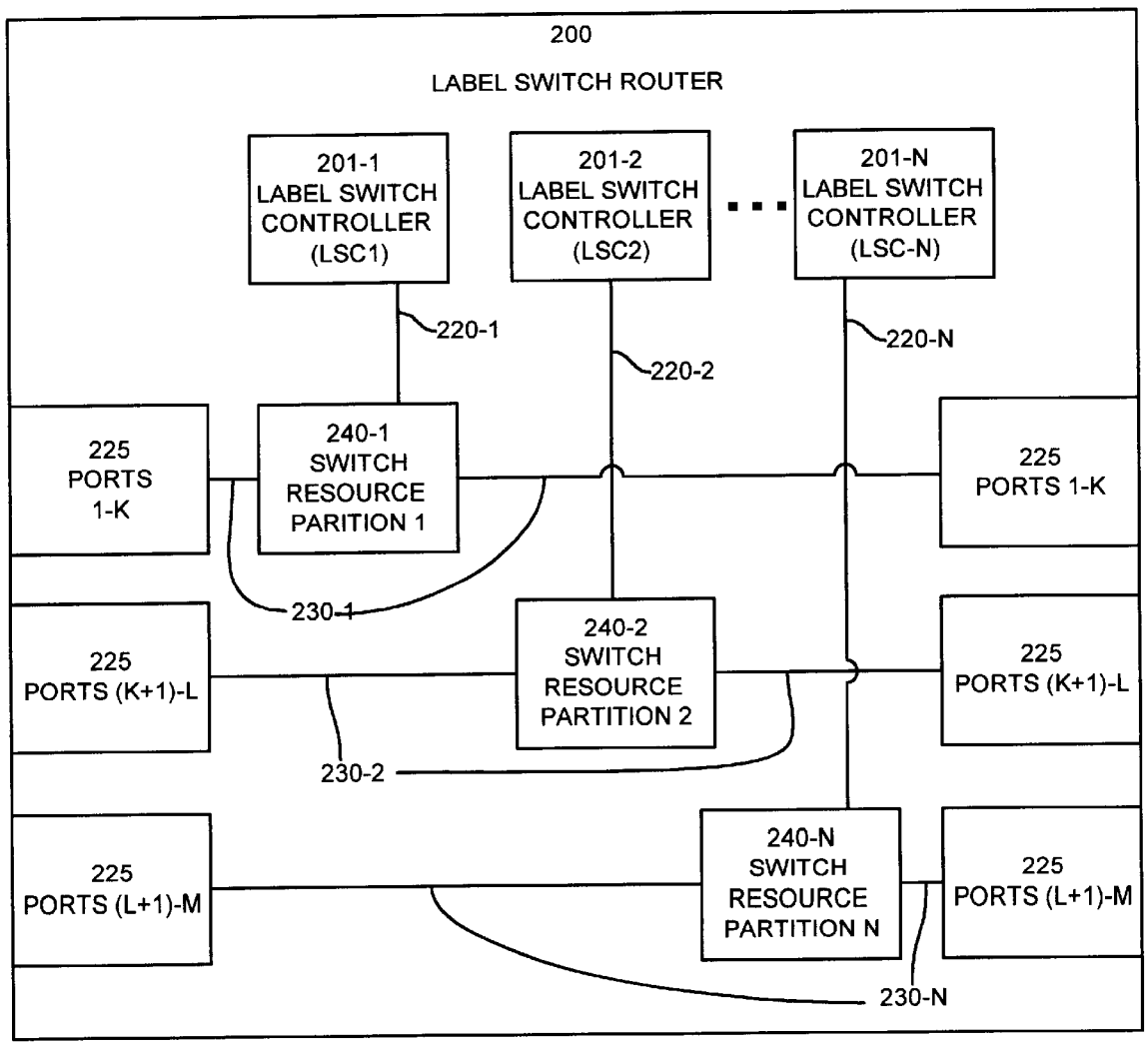
FIG. 8
LSR FULLY PARALLEL ARCHITECTURE

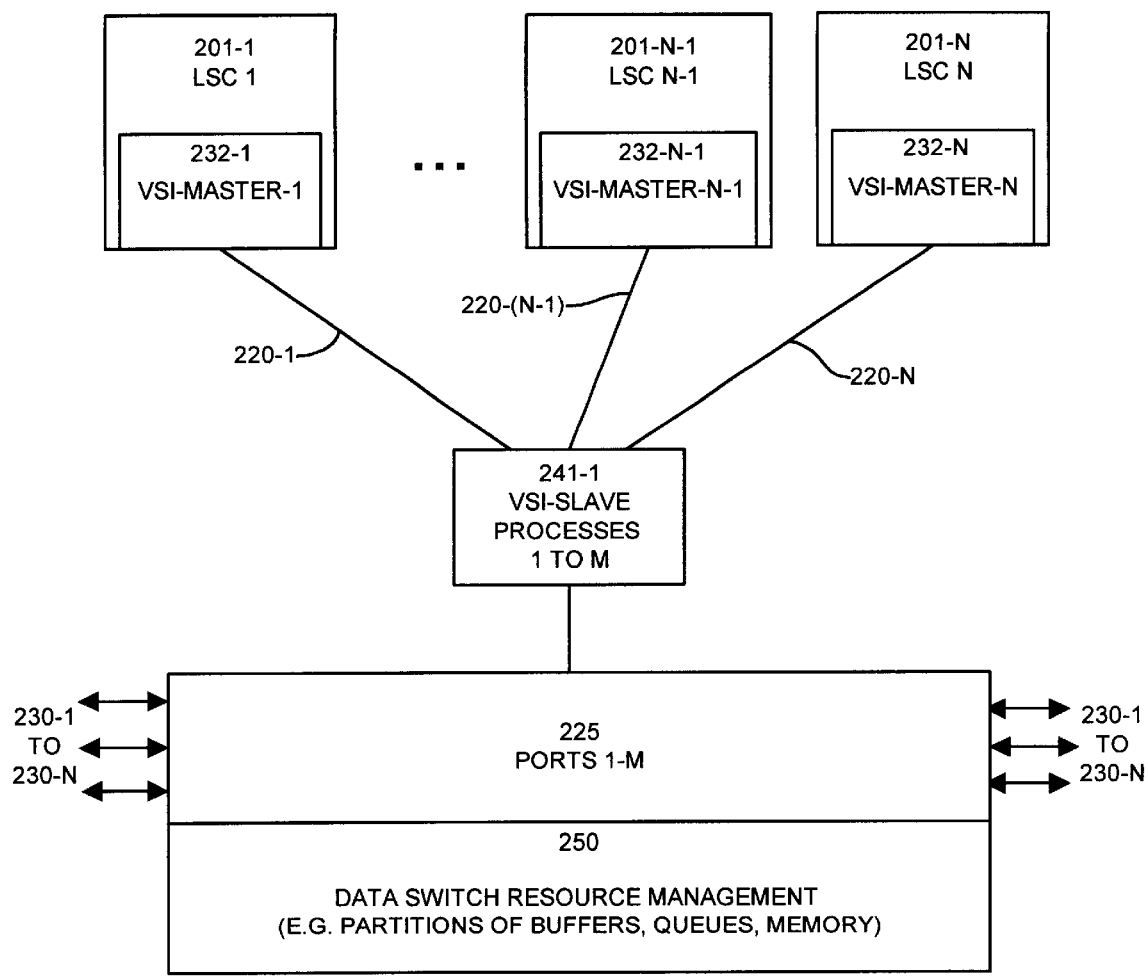
VIRTUAL SWITCH INTERFACE CONFIGURED
IN A FULLY MESHED ARCHITECTURE
FIG. 9

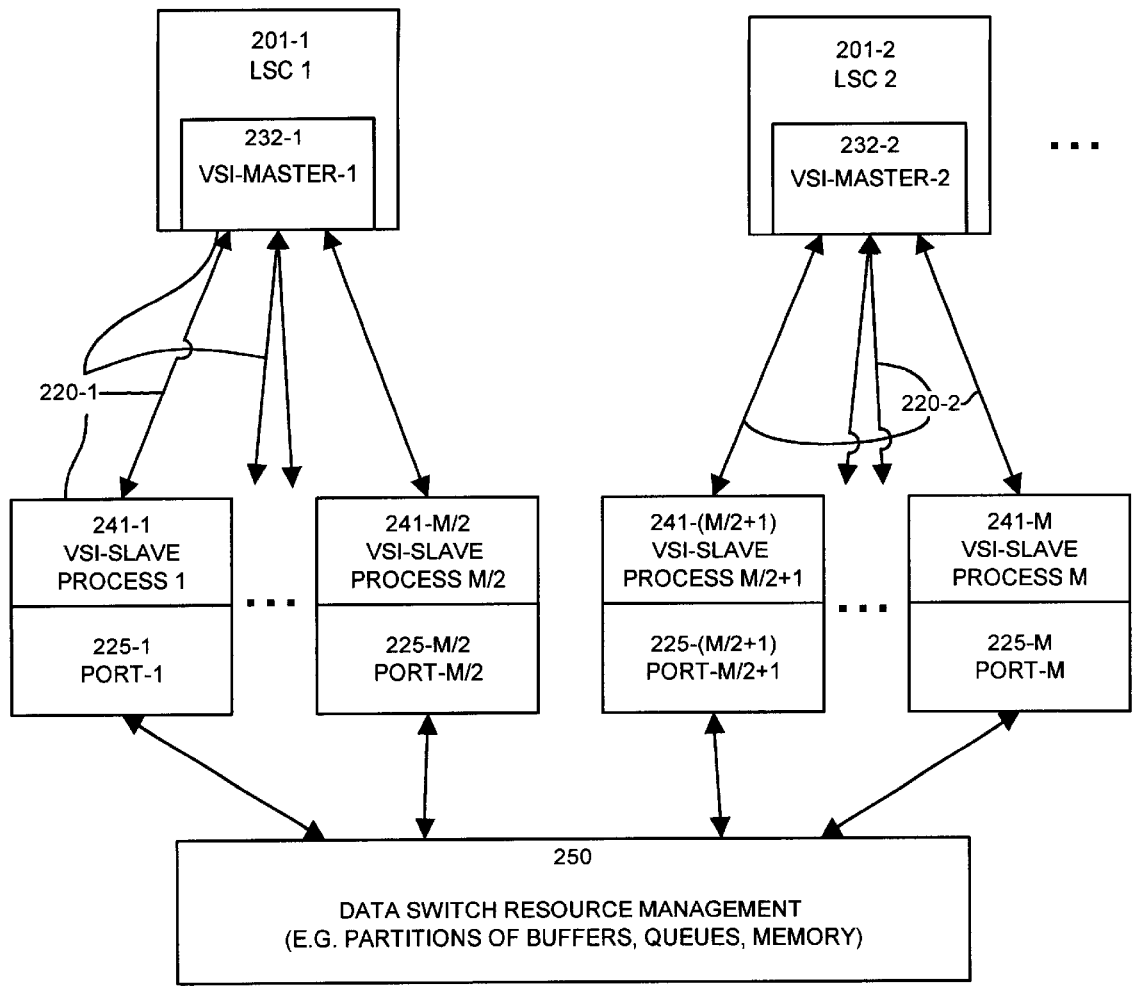
VIRTUAL SWITCH INTERFACE CONFIGURED
IN A FULLY PARALLEL ARCHITECTURE
FIG. 10

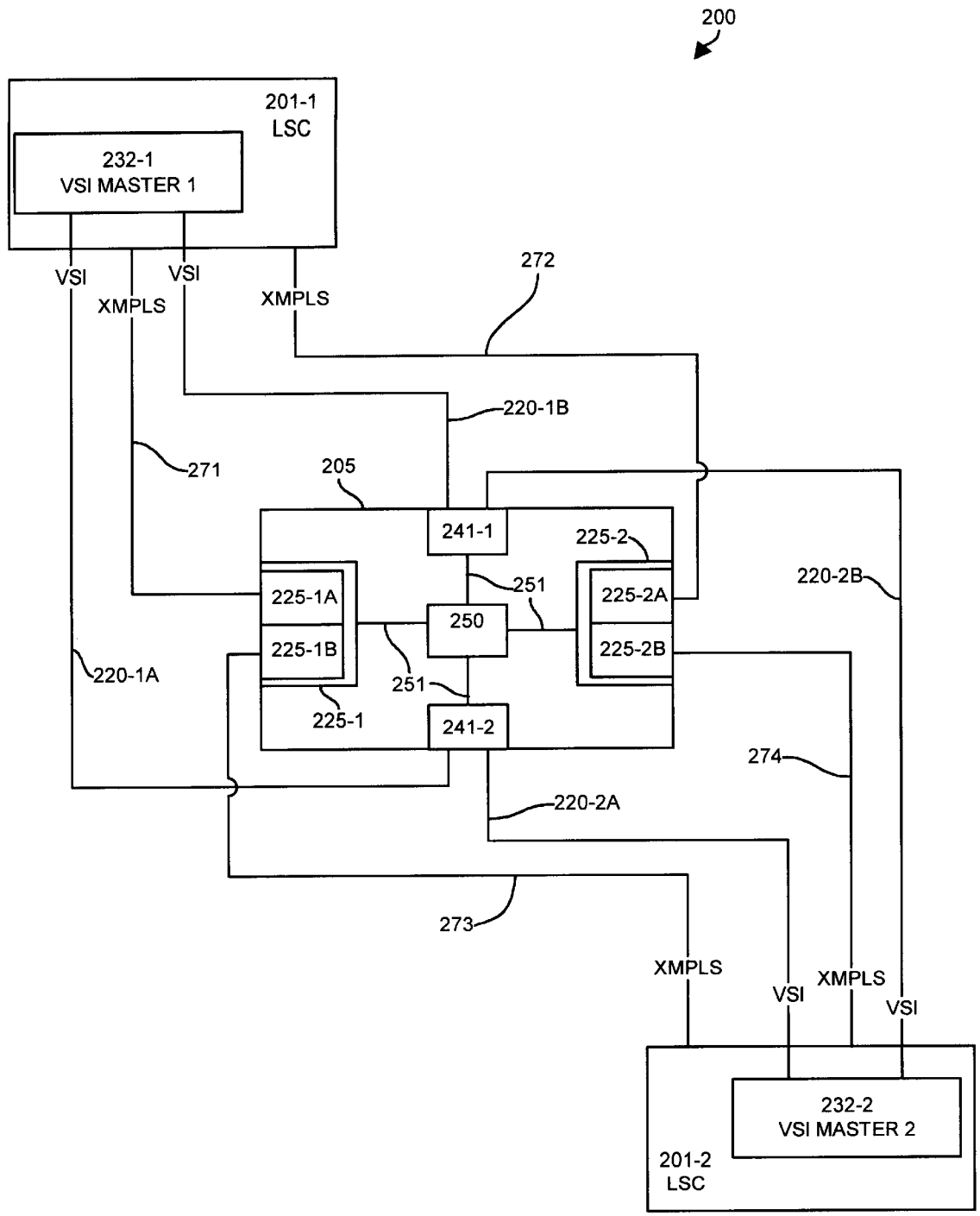
FIG. 11

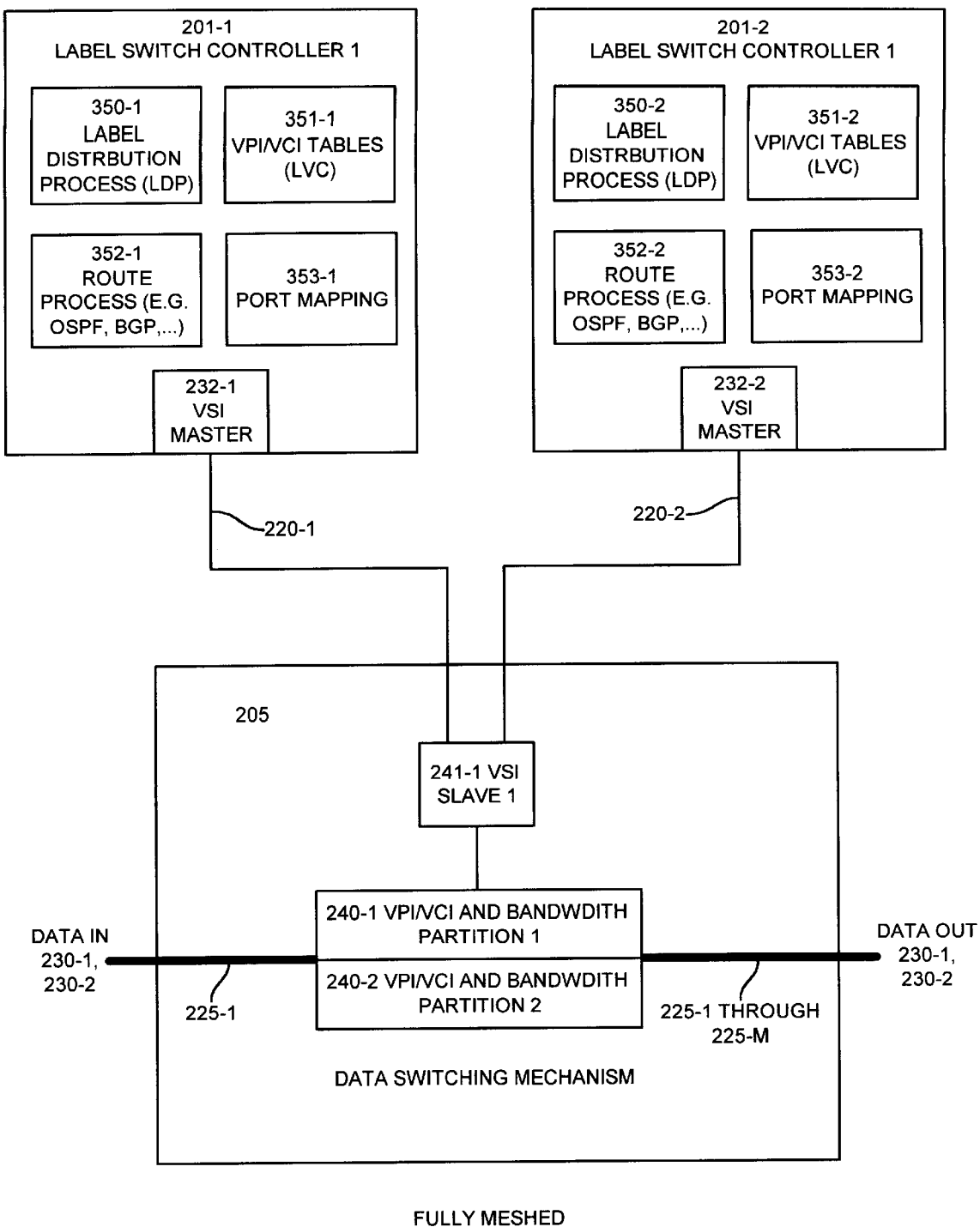
FIG. 12

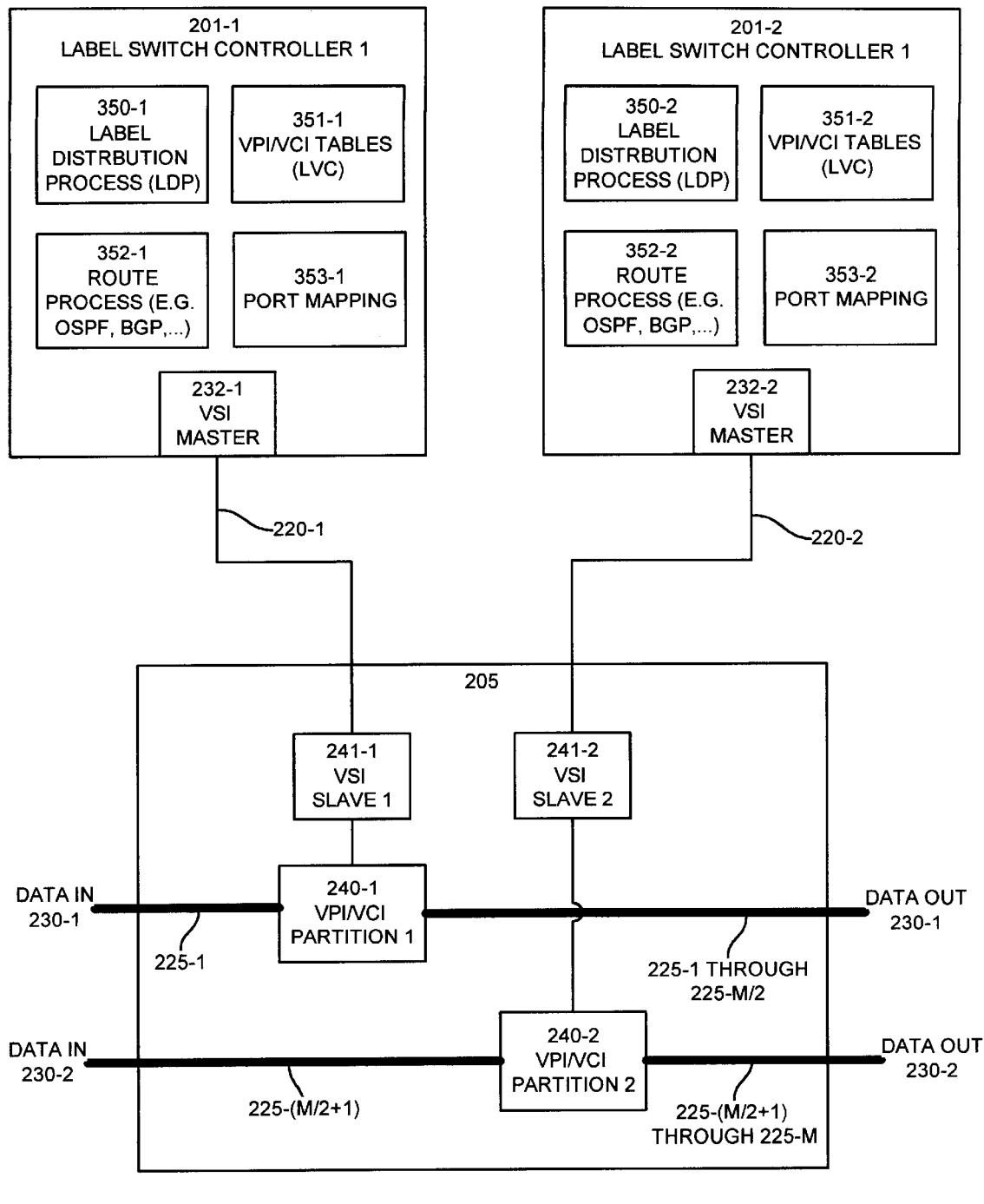
FIG. 13

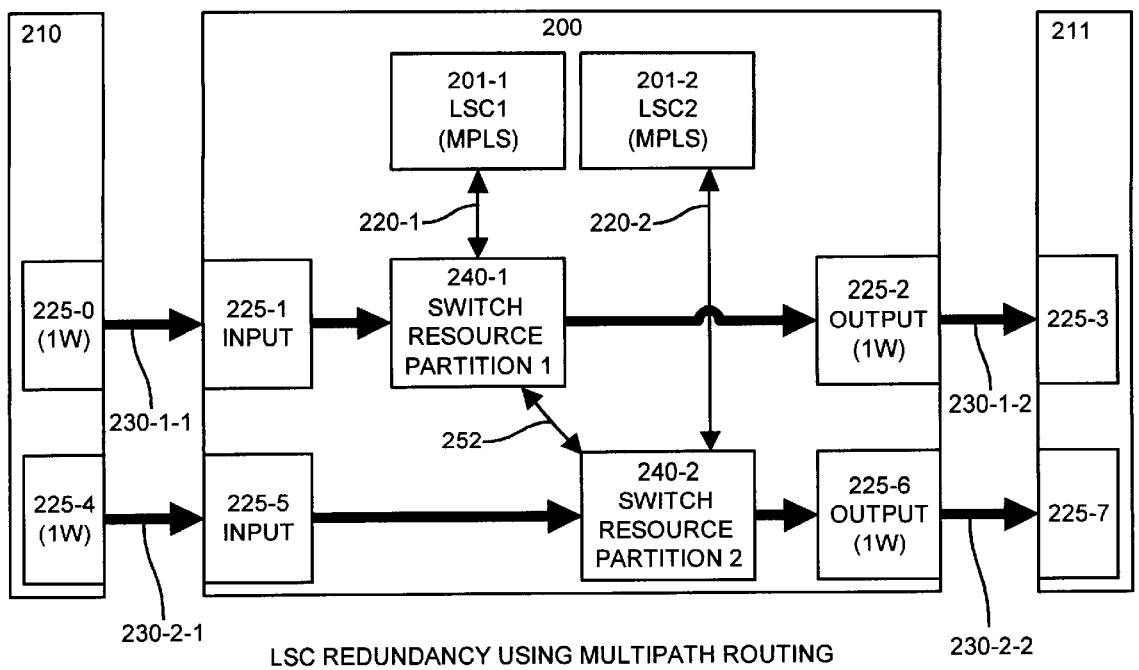
FIG. 14A
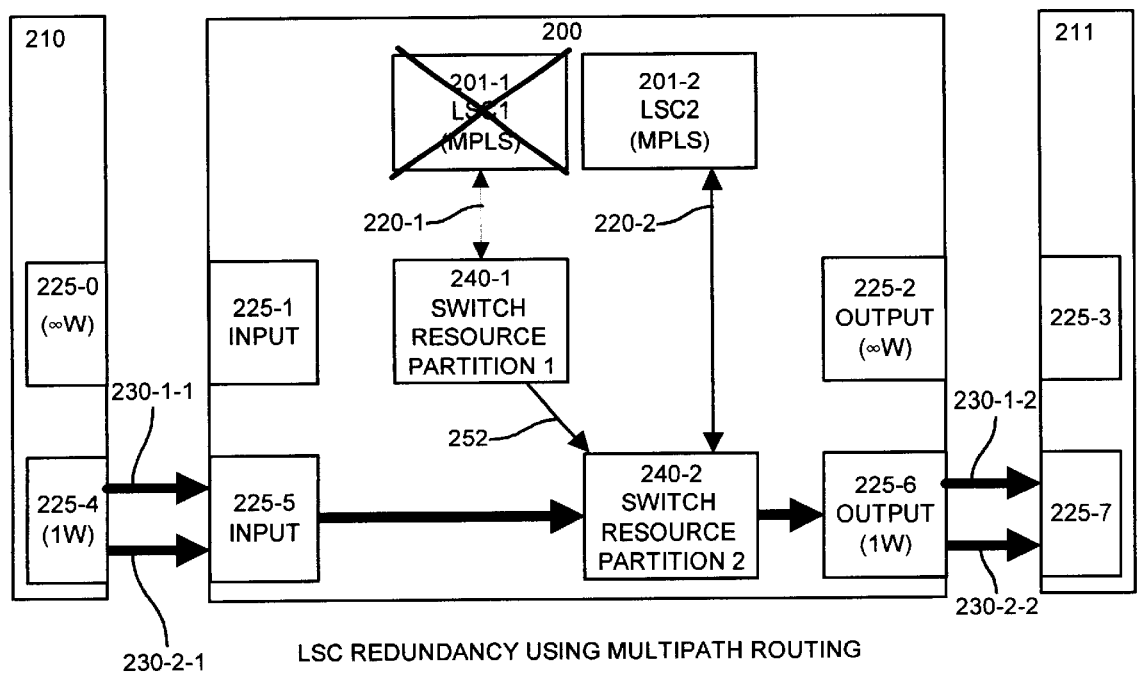
FIG. 14B

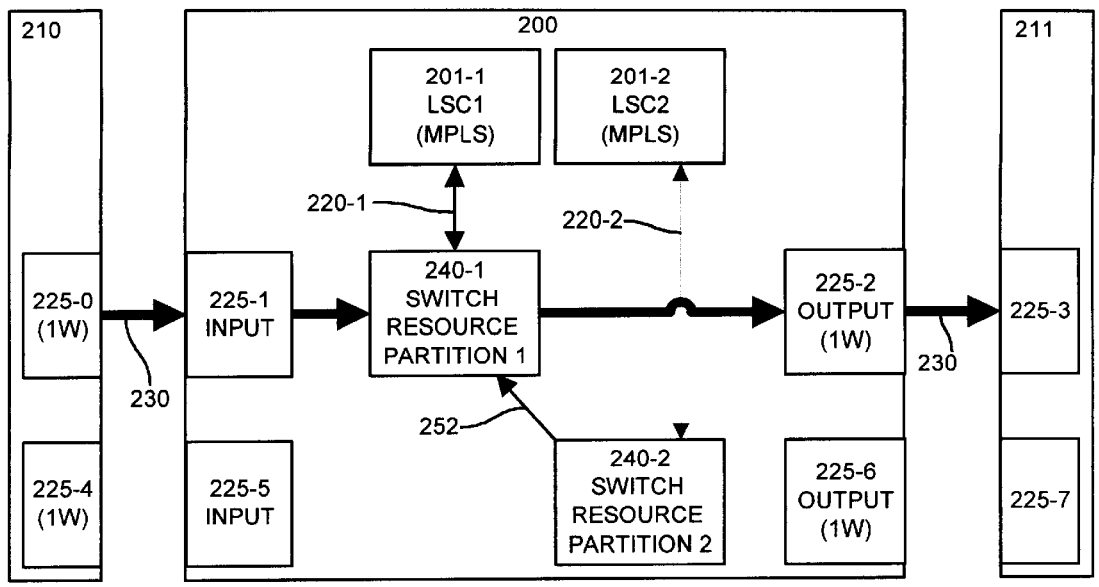
LSC REDUNDANCY USING UNIPATH ROUTING FOR ONE DESTINATION
FIG. 15A
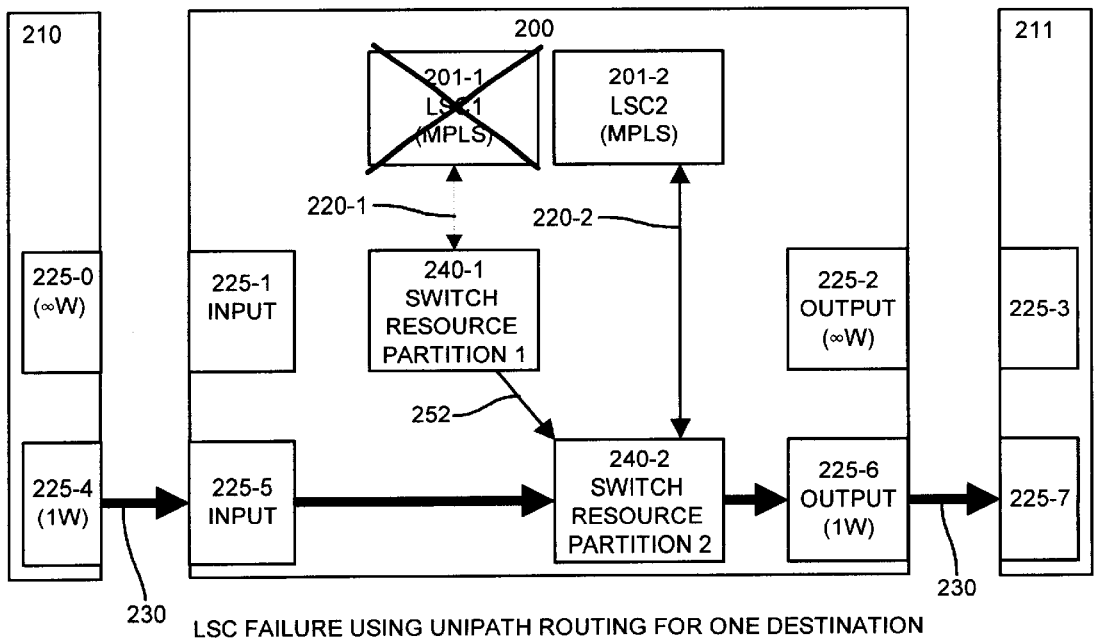
LSC FAILURE USING UNIPATH ROUTING FOR ONE DESTINATION
FIG. 15B

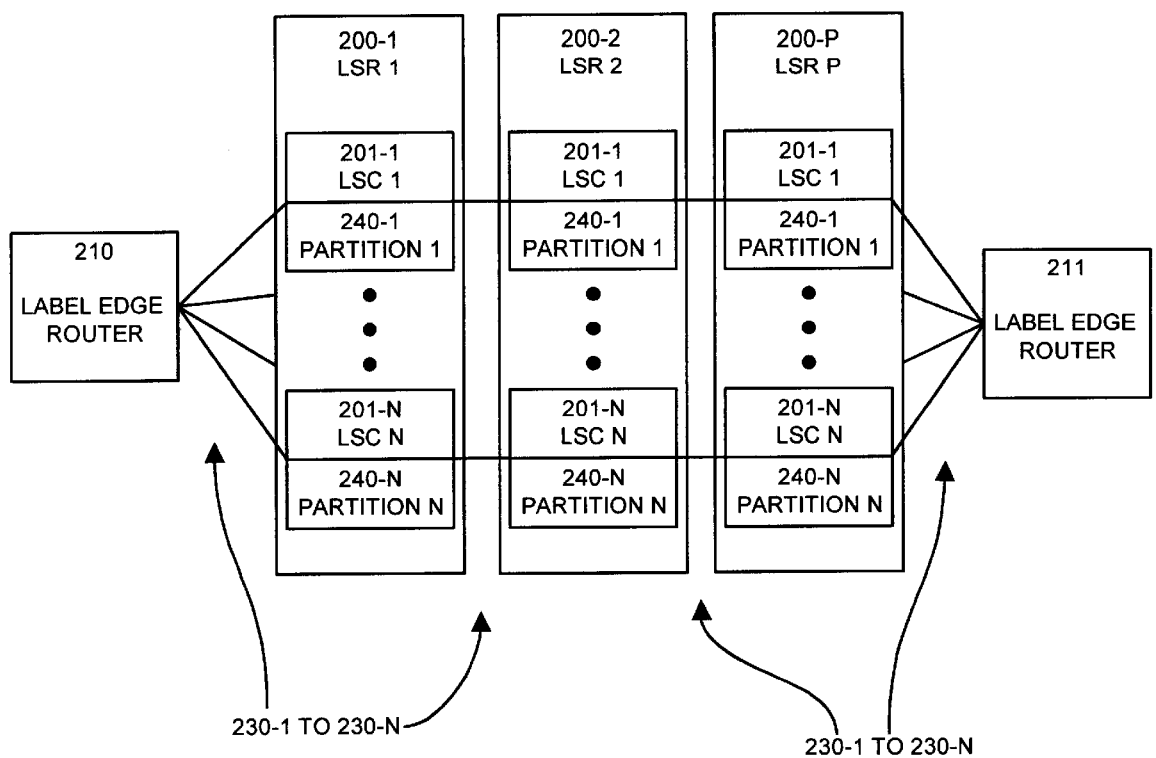
FIG. 16

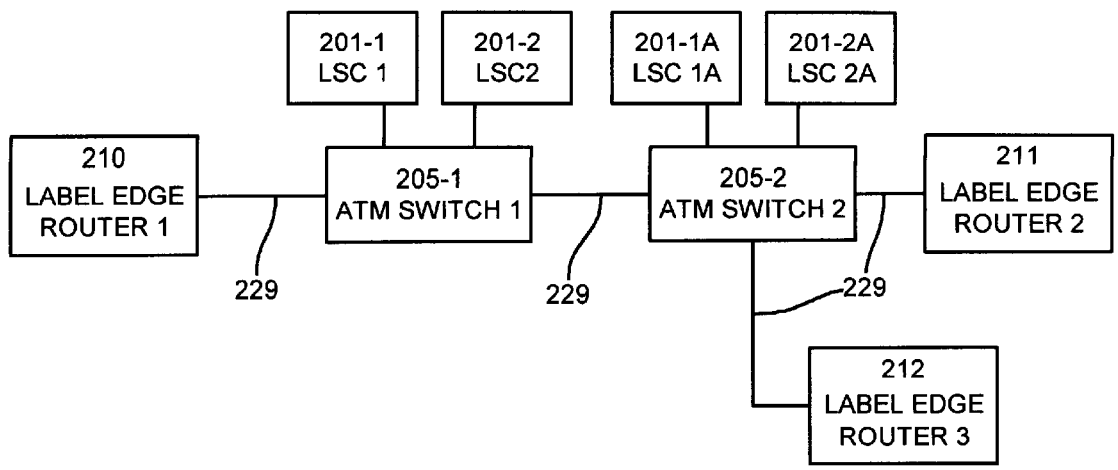
FIG. 17A
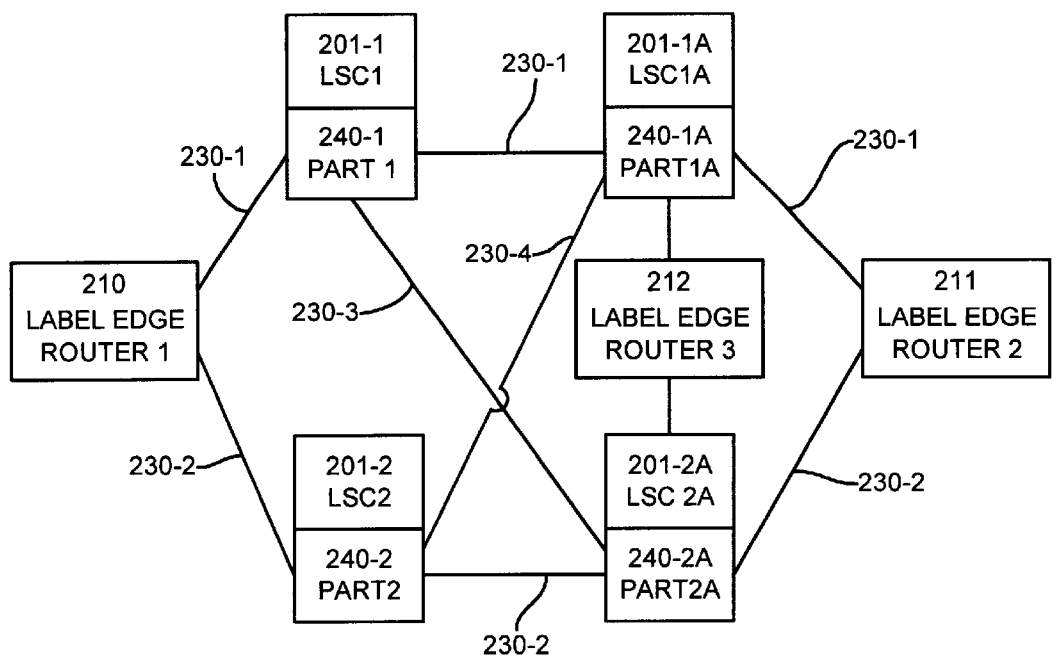
FIG. 17B

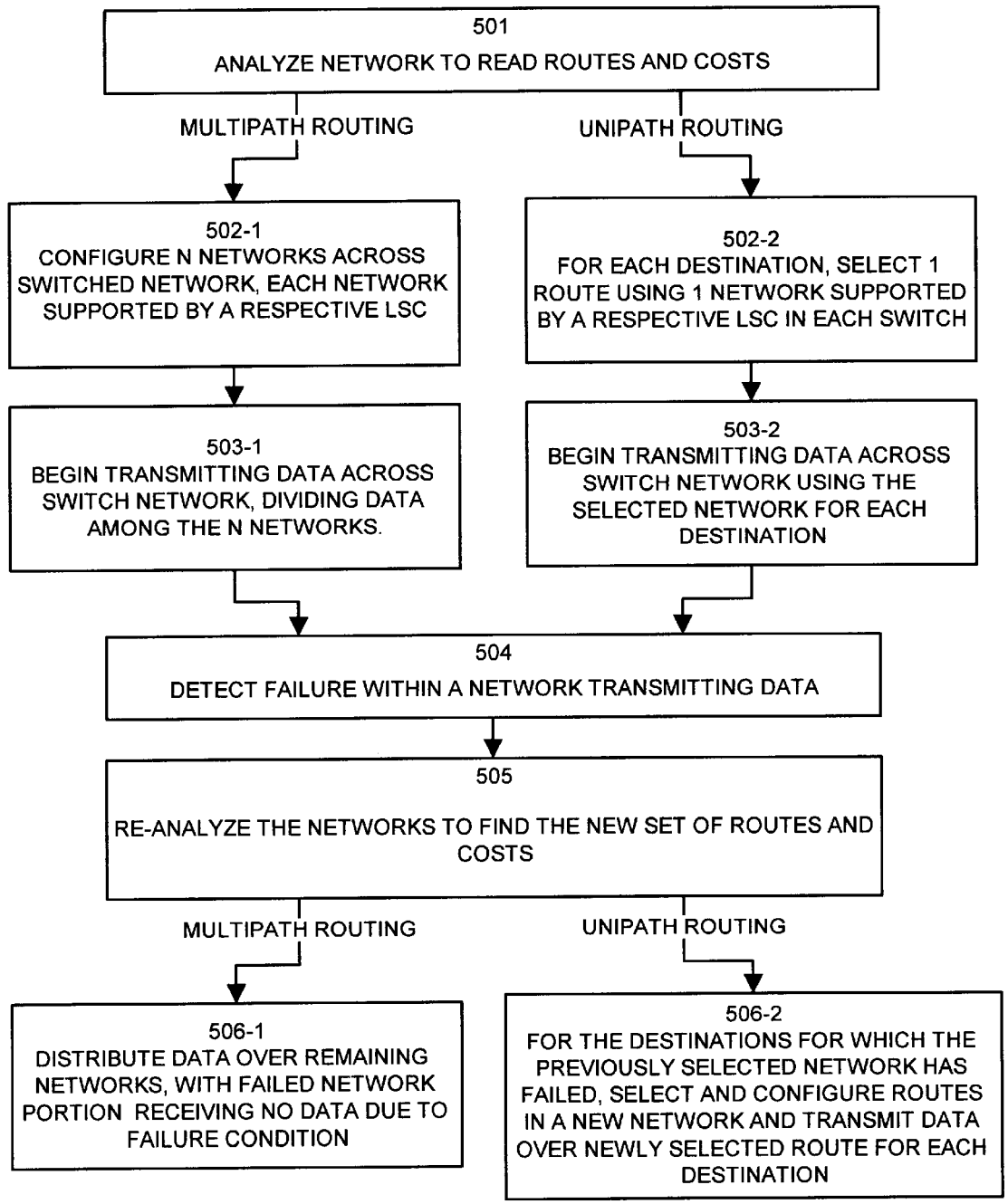
GENERAL LABEL EDGE ROUTER OPERATION
FIG. 18

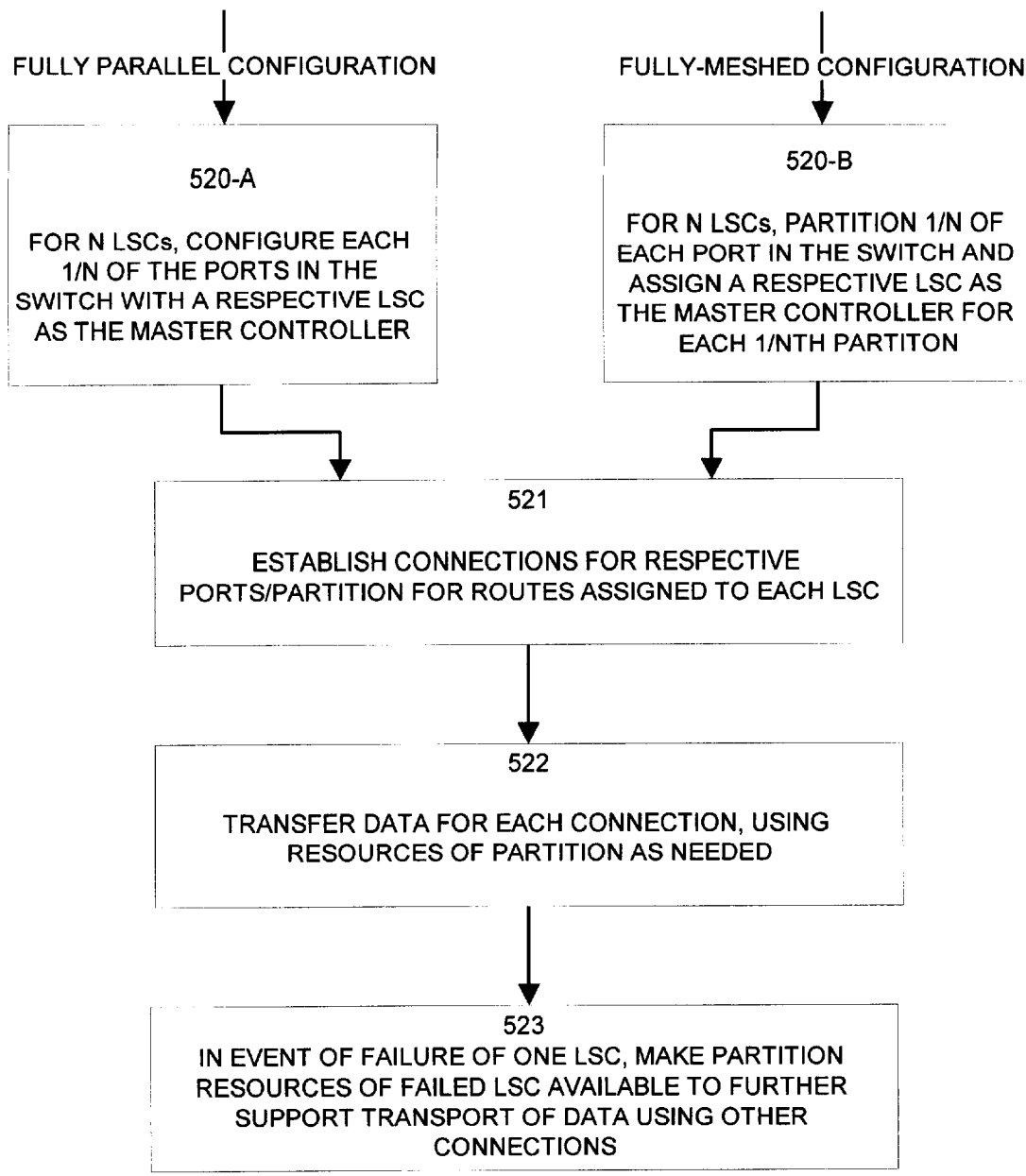
FIG. 19

APPARATUS AND METHODS PROVIDING REDUNDANT ROUTING IN A SWITCHED NETWORK DEVICE

BACKGROUND OF THE INVENTION

A typical communications network includes many hosts interconnected by various data communication devices. The data communications devices can be routers, bridges, switches, network access servers, gateways, hubs, concentrators, repeaters and so forth which can exchange data over an interconnection of data links. The data links may be physical connections or may be provided using wireless communication mechanisms. Applications which execute on the hosts can use various protocols to transfer data such as voice, video and computer application data (all collectively referred to herein as "data") across the network. The hosts may be general purpose computer systems such as personal computers, workstations, minicomputers, mainframes and the like, or the hosts may be dedicated special purpose computer systems or devices such as web-site kiosks, voice/data terminals, telephony, facsimile or email servers, video servers, audio servers, and so forth. Each host (computer system or other networked device) couples either physically or via a wireless data link to one or more of the data communications devices that form the network.

Generally, there are two basic implementations of modern communications network architectures: connection-based network architectures (FIG. 1) and connectionless network architectures (FIG. 2).

Connection-based Networks

FIG. 1 illustrates an example of a prior art connection-based network 100. Generally, the connection-based network 100 provides a single dedicated data path or "connection" 103 through each data communications device 120 through 127 for all data (not specifically shown) transferred, for example, between hosts 118 and 119. The dedicated connection path 103 represents the resources (e.g. circuits, buffers, ports, bandwidth, etc.) in each data communications device (120, 124, 125, 126 and 127) that are pre-allocated or dedicated to handle data transmission for the duration of the data communication session between the hosts 118, 119. Each data communications device 120 through 127 on the dedicated connection path 103 maintains the connection 103 (i.e., keeps resources allocated) for the life of the data communications session, even though data flow may not be constant (e.g. the data flow may be bursty) at all times during the session.

Once a connection is established in each of the data communications devices 120, 124, 125, 126 and 127 (defining the connection path 103), subsequent data transmissions between the hosts 118 and 119 may be performed with little additional work. This is because there is no need for each data communications device to determine a complex routing decision (i.e., selecting from multiple paths) for each data portion (e.g., packet, frame or cell) that arrives at the device. Rather, as a data portion arrives at one of the devices 120 through 127, the device simply channels the data along the pre-established connection 103 that is assigned for that data. Data communications devices used in connection-based network architectures are typically referred to as "switching devices" or "switches."

An example of a well known connection-based network is the Public Switched Telephone Network (PSTN). In a typical telephone network, when a caller picks up a telephone handset and dials a telephone number, one or more switches in the telephone network configure resources (e.g. phone lines and electronic switch circuitry) to provide a dedicated connection between the source (caller) and destination (callee) telephones. The connection exists for the duration of the telephone call and is maintained whether or not people are actually speaking to each other. All voice information takes the same connection path through the telephone network from one telephone to another. The connection is terminated (i.e., torn-down) when either party hangs-up their handset, causing each telephone switch used along the connection path to release any resources used for that connection.

In the context of computer networks, an example of a connection-based network is a network constructed from an interconnection of Asynchronous Transfer Mode (ATM) switches. ATM switches allow connections (typically called circuits or virtual circuit connections) to be established between hosts (which are typically computer systems). ATM switches transmit data in relatively small portions called cells using virtual circuits within each ATM switch that are dedicated to transferring data for the life of a particular session of data communications.

Changing the path of data for an active data communications session in a connection-based network is difficult since, generally, all data communications devices (e.g., ATM switches, telephone switches) on the entire connection path must reconfigure new connection information for the data and furthermore, these changes must be coordinated precisely across all the data communications devices. As such, connection-based network devices such as ATM switches generally provide only a single but very reliable path (e.g., connection 103 in FIG. 1) through the network upon which the data travels from one host to another during a session of data communication.

Connectionless Networks

FIG. 2 illustrates an example of a connectionless network 101. In contrast to connection-based network architectures, connectionless network architectures such as connectionless network 101 generally operate using a hop-by-hop methodology to transfer data within the network. During a single session of data communications, various data portions for that session, such as packets, may each take different paths 104 through the network 101, hence the name connectionless network. As an example, for data sent from host 105 to host 106, the data communication device 110 may forward some data to data communications device 111, while other data may be sent to data communications device 114, depending upon current conditions in the network 101. Conditions such as congestion or data link and/or data communications device failures may change during the life of a single data communications session and may affect decisions on where to send or route data with the connectionless network.

As indicated above, the process of determining the route(s) on which data shall be transferred to a network is usually called routing. There are various types of routing operations commonly used in communications networking. Three of such routing operations, referred to as routing protocols, are: unipath routing, equal cost multipath routing, and unipath multipath routing. The routing protocols enable a device to select a particular path of link for data transfers. Once selected, a process of forwarding is used to transfer data from device to device in the network. Both routing and forwarding occur in both connectionless and connection-oriented networks. However, a device in a connectionless network which routes and forwards data is referred to loosely as a "router."

In general, unipath routing protocols use only one path at a time to a given destination, even if several equally good paths are available. Most routing protocols are unipath, or have a unipath mode of operation. A commonly used routing protocol called Open Shortest Path First (OSPF) typically operates in a unipath mode unless equal-cost multipath routing is enabled or turned on in the protocol.

Equal-cost multipath routing protocols will distribute data traffic such as packets across multiple paths to a given destination, but only if there are multiple paths available, each with the same minimum cost or weight. Costs and weights are simply metrics associated with paths that can be used to determine path selection if multiple paths are available to reach a single destination. In equal cost multipath routing, if there is only one path available with the minimum cost, then the equal-cost multipath routing protocol will choose only that one path.

Unequal-cost multipath routing protocols may distribute traffic across multiple paths to a given destination, even where some of the paths have greater cost than others. Unequal-cost multipath modifications to OSPF have been proposed.

As noted above, a router is one type of data communications device commonly used to transfer portions of data, such as packets, in a connectionless network using one of the above mentioned routing protocols. Generally, a router analyzes addressing or other information in each packet received on a port (i.e., from a data link) to determine which path 104 (i.e., which port) to forward the packet to next within the network 101. A routing protocol such as OSPF can be used to establish and maintain routing tables (not shown in FIG. 2) indicating the current available paths for data based on a destination address of the data. The routing tables may dynamically change in response to the routing protocol detecting changing network conditions. Changes to the routing tables can occur at any time and can cause packets in a stream of data bound for the same destination (i.e., a host) to be directed onto different data links.

Connectionless networks have proven to be quite reliable due to their ability to make real-time routing decisions as data is transferred during a data communications session. The reconfiguration of routing tables and redirection of data in a connectionless network can occur in a relatively short time after the routing protocol learns of a problem (e.g. congestion or device failure) within the network. Generally, routing decisions made by a protocol such as OSPF are affected primarily by the state of the connectionless network, and not by the requirements of the individual connections themselves, unlike connection-based network devices (e.g., switches) which, by contrast, establish connections once based on where the data is to arrive and then maintain the connections (e.g., path 103 in FIG. 1) for the duration of a data communications session. Accordingly, re-routing in a connectionless network is a fast and relatively simple operation. An example of a connectionless network is a computer network operating the Internet Protocol (IP) (often referred to as an IP network), such as the Internet.

Switch Redundancy

Though switches used in connection-based networks offer high speed data transfer capabilities, they have limited or no ability to re-route data traffic in the event of network failures. As such, switches are often designed with high levels of redundancy to allow continued operation in the event of failure(s). Many components in a data communications switch have a secondary (i.e., spare or redundant) component designed to be used in the event of a failure of the first component. For example, a highly redundant switch may have redundant line cards, power supplies, fans, backplanes, switch fabrics (circuitry interconnecting the various line cards and data ports in the switch), and control cards. Switches using redundant components must also include redundant circuitry and/or redundant control software to handle the changeover required from a primary component to the redundant component in the event of a failure.

In redundant switch designs, a redundant component typically exists in a warm- or hot-standby relationship to the primary component (i.e., active) counterpart. For example, in the case of redundant line cards, connection state information may be concurrently programmed in both an active (e.g. primary) and a hot-standby (i.e., redundant or secondary) line card. The active line card uses the connection state information to perform data transfers, while the hot-standby line card performs no data transfers. However, in the event of a failure of the active line card, the hot-standby line card can take over and maintain the existing connections to ensure minimal circuit disruption. In warm-standby redundancy, when a changeover is required from an active line card that fails to the warm-standby line card, the warm-standby line card is typically unable to maintain the connection and thus resets the connections and proceeds to re-establish them.

Active (i.e. primary) and standby (hot or warm) switch components and processes are coupled in a relationship in that they are two components (or processes) to do the same job or task at different times, and thus they do not act independently and/or concurrently to each other. The coupling relationship exists so that when the active component fails, the standby component can take over the same job. Switch redundancy reduces the need to re-route connections. However, if re-routing connections in a connection-based (i.e., switched) network is supported and must be performed (e.g., in event of total failure of required switch components), the process may take several minutes to re-establish all connections through a different switch path. Typical connection re-routing times required for connection-based networks are often too long for situations requiring high reliability.

Routable Switches

Relatively recent advancements in connection-based networking technology, particularly in networks that use ATM or Frame-Relay switches, have provided mechanisms which allow a connection-based switch to act more like a connectionless router. One such technology is known as "tag" or "label" switching or "Multiple Protocol Label Switching" (MPLS). MPLS uses a label distribution protocol such as the "Label Distribution Protocol" (LDP), the "Constraint Based Routing with LDP" (CR-LDP) protocol, the "Resource Reservation Protocol" (RSVP) or a similar protocol to allow a switch to be controlled in conjunction with a routing protocol such as OSPF, BGP, IS-IS or similar routing protocol. The LDP protocol will be used as an example label distribution protocol herein when discussing the operation of MPLS technology. Generally, in MPLS technology, LDP and the routing protocol work together to configure virtual circuits (VCs) within a prior art connection-based switch. The VCs are optimized for the needs of connectionless traffic.

FIG. 3 illustrates a conventional switch network 152 in which a number of connection-based data switches 170 through 173 are configured to operate much like connectionless routers. As shown in FIG. 3, network devices called Label Switch Routers (LSRs) 160 through 163 are formed from the prior art data switches 170 through 173, which may be ATM switches for example, that are each configured to operate in conjunction with a respective prior art route controller 175 through 178. The LSRs 160 through 163 operate in conjunction with the label edge routers 153, and 154 on the connectionless networks 150 and 151 to provide connectionless data transfer capability through the switch network 152.

Within each prior art LSR 160 through 163, the prior art route controllers 175 through 178 operate LDP and a routing protocol (not specifically shown) in communication with the label edge routers 153 and 154 to implement the label switching technology. As such, the LSRs 160 through 163 (each formed from a switch coupled with a route controller) provide a route or data path 141 (i.e., many of which form a network 141) that provide connectionless data transfer capabilities within the switch network 152.

Details of the operation of prior art label switching technology, prior art route controller operation, and the relationship of these technologies to prior art data switches can be found in the documents listed in Appendix A, located at the end of the detailed description section of the invention. The entire contents of each of the documents in Appendix A is hereby incorporated by reference in their entirety. MPLS technology and it's use of label distribution protocols such as LDP and routing protocols are also discussed in these documents. A brief overview of this technology follows.

Generally, as illustrated in switch network 152, the coupling of each route controller 175 through 178 to a respective data switch 170 through 173 forms respective Label Switch Routers (LSRs) 160 through 163 (labeled LSR1 through LSR4). Essentially, each LSR 160 through 163 provides many of the capabilities of a connectionless router due to the route controllers (175 through 178) implementation of LDP and a routing protocol in conjunction with the data transfer capabilities provided by each data switch 170 through 173. As discussed in detail in the aforementioned documents (Appendix A), in MPLS, the LDP protocol works with a routing protocol such as OSPF to allow the route controllers 175 through 178 to dynamically control the respective data switches 170 through 173 to establish and route data over connections 141 to one or more other LSR's 160 through 163. In this manner, the LSRs 160 through 163 provide multiple data paths 141 (e.g. routes) through the switch network 152, which provides the data transfer capability that is typical of a connectionless network architecture. This contrasts sharply with the single data path 103 (FIG. 1) provided for a session of data communication in the network 100 of connection-based switches 120 through 127, as discussed above.

FIG. 4 illustrates data flow through a single prior art LSR, which may be any one of the LSRs 160 through 163 in FIG. 3. Since the LSRs 160 through 163 each operate much like a conventional connectionless router, a single network of routes 141 is provided between each LSR 160 through 163 within the switch network 152. The data network 141 may support connectionless data transfer and may operate as an Internet Protocol (IP) network, for example. In such a case, packets for a connectionless session of IP data between connectionless networks 150 and 151 (FIG. 3) may be transferred through the switch network 152 using the IP data paths 141 between the LSRs 160 through 163, and each packet may potentially take a different route. For example, LSR1 160 may send IP packets to either LSR2 161 or LSR3 162. If the switch network 152 is an ATM switch network, the IP packets are each broken into a number of commonly labeled ATM cells for the actual data transfer operation.

Label Switching

FIGS. 5A, 5B and 5C provide a more detailed illustration of the operational architecture of a prior art Label Switch Router (LSR) 160 and its relationship to a prior art Label Edge Router (LER) 153 and another LSR (e.g., LSR2 161) when performing label switching. As illustrated in FIG. 5A, the data switch 170 (which is an ATM switch in this example) maintains a label virtual circuit (LVC) 145 between itself and the label edge router 153 and the LSR2 161 (i.e., the data switch 171 in LSR2 161 in FIG. 3). The LVC 145 is essentially a switched network connection that gets instantiated and controlled under direction from the route controller 175 in LSR 160, according to the needs of the routing protocol (e.g. OSPF). The LVC 145 provides a route for data transfer on the IP network 141 (using switched virtual circuit connections to transfer data) between each LSR 160 through 163.

The switch control interface 180 allows a separate control plane operating separate processing logic (which in this example is the route controller 175 operating the label switching protocols) to control and manipulate switch resources (e.g., circuits, buffers, queues, interfaces, ports, etc.) in the data switch 170 to provide LVCs 145, as needed. Generally, to do so, an MPLS process 182 in each route controller 175 through 178 executes a label exchange protocol (e.g., LDP) and a routing protocol (e.g. OSPF) and uses the switch control interface 180 to setup, remove or change the LVCs 145 in each LSR 160 through 163 according to the needs of routes. Application or session data (i.e., IP packets travelling from LER 153 to LER 154) passes only through the data switch 170 via the LVCs 145 and does not get passed up to the route controllers 175 through 178. However, each route controller 175 through 178 does maintain its own IP network address, and thus the LDP and routing protocol and control information (e.g., protocol packets) 174 can be directed (i.e., routed) to specific route controllers 175 through 178 using the LVCs 145 as well. This allows each route controller 175 through 178 to be an independently IP addressable network entity, and thus the combination of the router controllers 175 through 178 and the data switches 170 through 173 form respective individual LSRs 160 through 163 that provide routing capability in the switch network 152 (FIG. 3).

While not shown in detail, each Label Edge Router LER 153 and 164 (FIG. 3) serves as an end point for the label virtual circuits 145 and can communicate with the MPLS processes (e.g., LDP and OSPF) 182 in the route controllers 175 through 178 to create the connectionless network connections (i.e., routes) between the LSRs 160 through 163 via the label virtual circuits 145. The operation of label switching will be further understood with reference to FIGS. 5B and 5C.

FIG. 5B illustrates a prior art IP address/label lookup table 185 maintained, for example, by the Label Edge Routers 153 and 154 and by each MPLS control processes 182 in the LSRs 160 through 163. During the label switching operation, when a particular IP packet (not shown) is to be transferred, for example, from the connectionless network 150 (FIG. 3) across the switch network 152 to the connectionless network 151, the Label Edge Router 153 examines the destination IP address of the packet. If the IP address exists in column 185-1 in FIG. 5B, then the packet is transmitted as a series of commonly labeled ATM cells (not shown) out of the port (in the LER 153, not specifically shown) indicated by the label in the label/interface table 190 in FIG. 5C. In this case, packets destined for an IP address of any host on connectionless network 151 (or for the IP address of any route controller 175 through 178 in network 152) are sent as a series of commonly labeled ATM cells to the LSR1 160. Each labeled ATM cell includes label information corresponding to the IP address of the packet shown in column 185-2 of table 185 (e.g., ATM cells are labeled 1/1 for a packet having an IP address equal to 1.2.3.4). If no label entry exists for the IP address in table 185, then the LER 153 creates a new IP address/label entry (i.e., new row entry in table 185) for the destination IP address.

As explained in more detail in the MPLS documentation incorporated by reference (Appendix A) above, the MPLS processes 182 (FIG. 5A) in each route controller 175 through 178 also maintain an IP address/label table (e.g. 185) and a label/interface table (e.g., 190) which are similar to those shown in FIGS. 5B and 5C. As such, each is able to detect incoming/arriving labeled cells and can match the labels of those cells via column 190-1 (Table 190 in FIG. 5B) to determine the proper outgoing port (e.g., an ATM port in the data switch) as specified in column 190-2 (FIG. 5C). Using the OSPF or a similar routing protocol, the MPLS process 182 can also determine new routes for packets as needed. The label/interface table 190 (FIG. 5C) and/or the IP address/label table 185 (FIG. 5B) can be dynamically modified and updated accordingly to provide route changes for labeled ATM cells. By altering the tables 185 and 190, re-routing of data can be accomplished in the IP network 141. Generally, since ATM cells do not have associated IP addresses of their own, each cell is provided with a corresponding label that is associated with the IP address of the data (i.e., packet) which the ATM switch 170 is transporting. In an ATM network, the label information is carried in the virtual connection identifier field in the cell. Thus, on each ATM link (i.e., each physical connection), a label corresponds to the different virtual circuit. All cells used to transport data for a particular packet will share a common label and will be routed in a similar manner. The LSRs 160 through 163 therefore benefit from the high speed throughput of the data switches 170 through 173 as well as the flexibility of altering data paths provided by label switching and routing techniques.

Multipath Routing

The prior art MPLS processes 182 in each LSR 160 through 163 can execute any type of routing protocol, such as OSPF. As noted above, the OSPF protocol supports a type of connectionless multipath routing. Using multipath routing, a data communications device such as a router or LSR (e.g., 160 through 163 in FIG. 3) may use different segments of the same IP network (e.g., different paths or routes in IP network 141) to forward packets towards any specific final destination. By way of example, in FIG. 3, the network 141 formed from the LSRs 160 through 162 provides a variety of paths or routes that data may take to successfully reach a destination. To transmit a packet (as a series of ATM cells) from LSR1 160 to LSR4 163, a route may be taken straight from LSR1 160 to LSR4 164, or data may be routed to either LSR2 161 or to LSR3 162, and then on to LSR 163. Using multi path routing, each of these different data routes may be assigned a weight or cost metric. A data route with a lessor weight or cost may be favored (i.e., may receive more data) over a data route having a higher weight. Thus, if two routes to LSR 163 (e.g., the path between LSR1 160 and LSR2 161 and the path between LSR1 160 and LSR3 162) are given the same cost, then data is sent more or less equally across the two routes. For example, one packet may be sent from LSR1 160 to LSR2 161 while another packet bound for the same eventual destination may be sent from LSR1 160 to LSR3 163. This is a description of equal cost multipath routing which allows data to be distributed over multiple equally weighted routes. Unipath multipath routing, also as indicated above, can be used to select a route having the lowest cost for data transfers. If many routes all have the different cost, unipath routing selects may select one or more of the routes for data transfer. In any event, multiple paths can be used.

SUMMARY OF THE INVENTION

Certain drawbacks exist in prior art implementations of connection-based switched networks that incorporate routing techniques, such as switched networks that use label switching as explained in the above examples. On such drawback is the requirement that connection-based switched networks be highly redundant. As noted above, data switches (e.g., 170 through 173 in FIGS. 3, 4 and 5A) operating alone (i.e., without a route controller) have a very limited ability to reroute data and are therefore quite redundant in design. The redundant componentry in a data switch allows certain failures to occur without severely disrupting the transport of data through the switch.

When a data switch (e.g., one of 170 through 173) is combined with a route controller (e.g., one of 170 through 175) to form an LSR (e.g., 160 through 163), the capability to re-route data over a switched network further enhances network reliability, as failed LSR's may be avoided (routed around) via re-routing. However, from the perspective of a single LSR (i.e., just one of 160 through 163), the highly redundant architecture of the data switch portion 170 through 173 does not necessarily extend, nor scale well, to the route controller portion 175 through 178. That is, redundant implementations of route controllers (e.g., redundant ones of route controllers 175 through 178 for a single data switch) in a prior art LSR do not exist due to difficulty in maintaining consistency of information, such as routing table and connection state information, between a primary route controller that suddenly fails and a hot or warm standby route controller that must take over for the failed primary route controller.

The present invention is based in part on the observation of such drawbacks and provides an alternative to systems that attempt to use hot or warm standby route controllers used within an LSR. Generally, the present invention provides duplicate route controllers which each operate independently and concurrently to provide route controller redundancy within an LSR. This design differs significantly from hot or warm standby switch designs in which a standby component takes over for a primary component in the event of a failure. Instead, the techniques and architectures provided by this invention allow multiple route controllers, called label switch controllers (LSCs), to concurrently control partitions of resources within the same data switch at the same time. Within a single LSR, there need not be any relationship between the two (or more) redundant LSCs, nor need there be knowledge or sharing of each others existence, state, connections or operation information once configured. Each LSC controls a partition of the switch resources to support a unique, but parallel route, in relation to the other LSCs coupled to the same switch.

As a result of such a design, during operation of one embodiment which uses multipath routing protocol, the architecture of the invention can provide multiple parallel IP networks which may be in full or in part physically and/or logically parallel. As will be explained in more detail, multipath routing techniques allow data to be transferred concurrently using each of the parallel IP networks (i.e., each of the parallel routes) provided by the separate and concurrently operating LSCs. In the event of a failure of one of the networks (e.g., a failure of one of the multiple LSCs in an LSR), the other IP network(s) supported by the other still functioning route controller(s) can share the data load formerly carried by the failed IP network, as each network has a route having equal costs.

In another embodiment which uses unipath routing, multiple LSCs can be similarly configured with parallel routes to control a single switch. A label edge router (at the edge of the switch network) can use unipath routing techniques to select one of the parallel routes supported by one of the similarly configured LSCs. The LSC supporting the selected route can provide the required data transfer capabilities through the switch and can use the bulk of the data switches resources (i.e., bandwidth, buffers, memory, etc.), while switch resources required for the other redundant LSCs remain minimally allocated. In the event of a failure of the LSC supporting the selected route, a route of another similarly configured LSCs coupled to the same switch can be selected by the LER. Switch resources used by virtual circuits established for the route of the failed LSC are released and can then be used by virtual circuits established to support the newly selected route(s) supported by the other LSC. Since the other LSC is already configured with the same routes as the failed LSC, there is no need for the failed LSC to provide state information to the second LSC that takes over. Both the multipath and unipath routing implementations have no limit to how many LSCs may be coupled to a single data switch, and thus redundancy may be greater than two-fold.

More specifically, the present invention provides a data communications device which includes a data switch mechanism. The data switch mechanism includes i) at least one port for receiving data; ii) at least one port for transmitting data; and iii) data switch resources coupled to the port(s) for receiving data and to the port(s) for transmitting data. The data switch resources are divided or distributed into a plurality of partitions. Each partition provides resources for concurrently and independently supporting at least one respective data route between the port(s) for receiving data and the port(s) for transmitting data. Each of the plurality of partitions including an interface allowing that partition to be concurrently and independently controlled by a respective switch control mechanism. This embodiment of the invention thus provides a data switching mechanism, such as an ATM, Frame-Relay or other connection-based switch to have interfaces for multiple switch controllers. Each partition supports a route through the switch. Preferably, the different routes are parallel in nature. Prior art switches generally lack the ability to interface to more than one of the same type of switch control mechanism and thus do not provide multiple partitions that can have the same routes. Such redundancy enables the invention to support highly reliable networking applications, as will be explained more fully below.

Another arrangement of the invention includes a plurality of switch control mechanisms coupled to the data switching mechanism described above. Each of the switch control mechanisms couples to the data switching mechanism via a respective interface of a partition and each concurrently and independently operates according to at least one connection routing protocol to advertise a respective route for data through the respective partition of the data switch resources. Since each switch control mechanism operates independently and concurrently of the others, multiple routes that are parallel can be provided by a data communications device configured as such.

In another configuration, the partitions of the data switch resources include a first partition and a second partition and the switch control mechanisms include a first and second switch control mechanism. In this arrangement, the first switch control mechanism controls data switch resources in the first partition according to a first connection routing protocol to provide a first route for data through the first partition, while the second switch control mechanism controls data switch resources in the second partition according to a second connection routing protocol to provide a second route for data through the second partition. In this manner, each switch control mechanism operates independently of the others. This allows failure of one to have little effect on the operation of the others.

In another arrangement, the first and second connection routing protocols are configured in parallel to offer the same routes, such that the first and second routes provided through the first and second partitions are parallel routes. This allows data to be routed via both routes to the same destination at the same time, or at different times in which case the first route can be used first, and if this route fails, the second route can be used.

Generally, in another configuration, the first route provided within the first partition is established as a corresponding first switched connection and the second route provided within the second partition is established as a corresponding second switched connection. The first and second switched connections handle data transfers concurrently according to a multipath routing protocol that distributes data between the first and second routes, such that the first and second switch control mechanisms support routes for distinct parallel networks that operate to transfer data concurrently through the data communications device. Since multipath routing is used and there are a plurality of parallel routes, each supported by a distinct respective switch control mechanism, concurrently operating parallel networks are provided through a single data communications device. Such networks provide significant advantages concerning the quality of service or redundancy in the event of failures.

As such, in another arrangement, a means is provided for detecting an inability of the first switch control mechanism to support the first route within the first partition. This may done, for instance, using the existence of not of communication between the switch control mechanism and a slave process in its respective partition, or the routing protocol may provide such fault detection. Also provided is a means, in response to the means for detecting, for re-routing a data stream transferred using the first route within the first partition to the second route within the second partition.

Another arrangement provide the above means in conjunction with a means for de-allocating data switch resources from the first partition used to support the first connection, and a means for removing the first connection from the first partition. A data switch resource management process can be used for this purpose, as will be explained in more detail later. Also included in this arrangement is a means, in response for the means for de-allocating, for allocating at least a portion of the data switch resources de-allocated from the first partition to the second partition, such that the portion of data switch resources that are de-allocated from the first partition are allocated to the second, partition in order to support data transfers on the second route provided by the second connection. In this manner, when a switch control mechanism fails, resources are released for use by other connections that now will handle the data transfers formerly handled by the failed routes.

In another configuration, the first route provided within the first partition is established as a corresponding first switched connection and the second route provided within the second partition has no corresponding second switched connection in the second partition. This configuration thus only use one route at a time (having a corresponding connection) to perform data transfers. The first switched connection handles data transfers according to a unipath routing protocol that initially selects the first route to perform data transfers. In this configuration then, the first and second switch control mechanisms each support routes for distinct parallel networks, but only one of such routes is selected according to the unipath routing protocol to initially transfer data through the data communications device.

In yet another arrangement, a means is provided for detecting an inability of the first switch control mechanism to support the first route within the first partition. For instance, a failure of an LSC can be detected. Also provided, in response to the means for detecting, is a means to establish a second connection in the second partition according to the second route supported by the second switch control mechanism. The second connection is used to provide data transfers of a stream of data formerly transferred through the first connection. This allows one route to handle data after the first route fails.

Related to the above arrangement, another arrangement is provided which includes a means for de-allocating data switch resources from the first partition used to support the first connection, and means for removing the first connection from the first partition. In response for the means for de-allocating, a means is provided for allocating the data switch resources de-allocated from the first partition to the second partition, such that the data switch resources that are de-allocated from the first partition are allocated to the second partition in order to support data transfers on the second route provided by the second connection. In this fashion, one route can be used first, and if it fails, another route can be selected and a connection can be established for the newly selected route. This arrangement uses unipath routing to select individual routes, and work well with a fully-meshed embodiment as will be explained.

In a fully-meshed arrangement there are a plurality of ports on the data communications device, and each port may serve as both an input and an output port. In this case, each of the plurality of partitions has access to a portion of an amount of bandwidth on each of the plurality of ports, such that the at least one respective data connection supported by each partition shares a total amount of bandwidth available on at least one port of the plurality of ports. In other words, the fully-meshed configuration allows the parallel networks to share the same physical links.

In a fully-parallel arrangement, each port may also serve as both an input and an output port, but each of the plurality of partitions has access to a total amount of bandwidth on a respective and exclusive set of ports selected from the plurality of ports, such that data connections maintained within each partition are transferred using the ports assigned to that partition and no others. In this manner, the parallel arrangement allows each network to perform data transfers using physically separate ports, and thus the networks are completely separated.

In another configuration, the data switching mechanism includes a plurality of slave processes. Each slave process is responsible for controlling resources associated with at least one respective port of the data communications device. Each slave process also communicates with at least two of the plurality of switch control mechanisms to receive routing information concerning a route concurrently supported by each of the switch control mechanisms with which the slave process communicates. This allows a port controlled by a slave to support at least two routes from two different switch control mechanisms.

The invention also provides a data communications device comprising a plurality of switch control mechanisms, each operating a respective connection routing protocol. A data switching mechanism is provided in this arrangement and has a coupling to each of the switch control mechanisms. Each of the switch control mechanisms independently and concurrently supports a route through the data switching mechanism according to the respective connection routing protocol operated by the switch control mechanism using resources from an partition of resources assigned to that switch control mechanism.

In one variation of this arrangement, the respective connection routing protocols operating on at least two of the switch control mechanisms are the same connection routing protocols and are configured to support routes that are the same. In this case, the parallel network routes are provided for selection through the data communications device by each of the switch control mechanisms that operate the same connection routing protocol, respectively. The data switching mechanism may be an ATM switch, for example, and the switch control mechanisms may be label switch controllers that operate at least one Internet Routing Protocol and at least one label distribution protocol according to multi-protocol label switching technology in order to concurrently route at least two streams of labeled ATM cells passing through the ATM switch at the same time. This allows ATM networks to have redundant LSCs on each ATM switch as explained herein.

In operation, if one of the switch control mechanisms fails to operate correctly, data transferred using the route supported by the switch control mechanism that fails is subsequently transferred through the data communications device using the route supported by at least one other correctly operating switch control mechanism within the plurality of switch control mechanisms.

Also, in another configuration, each route supported by each switch control mechanism has an associated connection established in the partition supporting that route. The connections associated with all of the routes concurrently operate according to a multipath routing protocol to transfer data through the data communications device in a parallel manner across multiple routes. As such, when one route fails, the connections for remaining non-failed routes continue to operate to transfer data through the data communications device.

As an alternative, one route supported by one of the switch control mechanism has an associated connection established in the partition supporting that route. In this case, the associated connection operates to transfer data through the data communications device according to a unipath routing protocol. When the route of the associated connection fails, a connection for a remaining non-failed route is established and operates to transfer data through the data communications device.

The invention also provides for an Asynchronous Transfer Mode (ATM) switch that includes a data switching mechanism for supporting data connections through the Asynchronous Transfer Mode switch. A plurality of switch control mechanisms are provided, each operating a similarly configured connection routing protocol and each implementing multi-protocol label switching technology to allow routing of labeled ATM cells. Each also independently and concurrently controls a respective partition of resources within the data switching mechanism to control a respective route for data through the Asynchronous Transfer Mode switch. The route controlled by one of the switch control mechanisms is configured in a parallel manner to the route controlled by another of the switch control mechanisms, thus providing a plurality of parallel network routes through the Asynchronous Transfer Mode switch.

An arrangement of such an ATM switch can also include a means for detecting a fault condition within at least one of the switch control mechanisms in the Asynchronous Transfer Mode switch. Also included is a means, responsive to the means for detecting, for re-routing data formerly transferred on a connection associated with a route provided by the at least one of the plurality of switch control mechanisms containing the detected fault condition by using a connection associated with a route provided by another of the at least one of the plurality of switch control mechanisms that does not contain a fault condition. This arrangement allows data streams using one or more connections supported by routes of failed LSC to be re-routed using the existing parallel routes provided by non-failed LSCs. Since the other parallel routes exist, and may already have associated connections, the re-route operation simply selects or uses these other routes.

Also included as an addition to this arrangement is a means, responsive to the means for detecting, for releasing resources controlled by the switch control mechanism that faulted, as well as a means, responsive to the means for releasing, for allowing another one of the switch control mechanisms to obtain control of the released resources. In this manner, data formerly transferred using the route maintained by the switch control mechanism that faulted is now transferred by the another route controlled by one of the switch control mechanisms that obtains control of the released resources.

The invention also provides various unique techniques, such as a method for transferring data through a data communications device. This technique involves configuring a plurality of parallel routes through a switched network device, with each route supported by a respective switch control mechanism interfaced to the data communications device. Each respective switch control mechanism is of the same type and is configured with the same connection routing protocol. The technique then transfers portions of data that are bound for the same destination through the data communications device by selecting, according to a routing protocol, at least one of the routes supported by at least one of the switch control mechanisms and transmits portions of data using a connection established for the selected route. Since multiple routes are offered, and one or more can be selected for use, the technique provides for high levels of redundancy.

The operation of configuring a plurality of parallel routes through the data communications device can further include the operations of analyzing the data communications device to determine a set of available parallel routes provided by each of the respective switch control mechanisms. For example, routing information maintained within the data communications device can be analyzed. The technique can then configure at least one network through the data communications device by selecting at least one route supported by a switch control mechanism within the data communications device for data transfers. Connections are then established within the data communications device according to the selected at least one route.

Techniques of the invention can also detect a failure of one of the routes supported by a switch control mechanism that is used to perform data transfers through the data communications device. In such a case, the technique then re-analyzes the network to determine a new set of available parallel routes provided by at least one switch control mechanism that is operating properly. As an example, the OSPF routing protocol can be used to routinely analyze the network (interconnected devices configured according to the invention) as a matter of course in order to determine available routes. Then, the technique can transfer a plurality of portions of data that are bound for the same destination through the data communications device by selecting, according to the routing protocol, at least one route from the new set of available parallel routes. In this manner, data transfers can still occur even if one route fails.

The routing protocol can be a multipath routing protocol and the route initially selected for the transmission of data cab actually be a plurality of parallel routes, each supported by a respective switch control mechanism. According to this technique, the route selected from the new set of available routes is the set of lowest cost routes supported by properly operating switch control mechanism and excludes the route containing the detected failure. Thus the failed route is avoided while the other parallel routes can still be used.

Alternatively, the routing protocol can be a unipath routing protocol and the route initially selected for the transmission of data is a single route of the plurality of parallel routes. In such a case, the route selected from the new set of available routes is another route supported by another properly operating switch control mechanism that is different from the route containing the detected failure. Thus the unipath technique uses one route, detects a failure, and then uses another route that is concurrently offered in parallel to the first route. Since both routes exist concurrently, each supported by a respective LSC, there is no need for an LSC supporting a newly selected route to obtain connection or state information from the failed LSC. In other words, the second step of transferring is performed without having to transfer state information from a failed switch control mechanism to the one or more switch control mechanism supporting the at least one newly selected route.

Another technique provided by the invention includes a method of transferring data through a data communications device. Generally, the technique configures partitions of resources of a data switching mechanism equally and respectively among a plurality of switch control mechanisms. Each switch control mechanism is then configured to independently and concurrently operate a connection routing protocol. The technique then transfers data through the data communications device by having each switch control mechanism support a route according to operation of a respective connection routing protocol. The routes cause a connection to be formed in the partition of resources configured for that respective switch control mechanism. In this technique, the resources in each partition are configured to provide data transfer connections capable of transferring data from one port to another in the data communications device. The connections of at least one partition are configured in parallel to the connections of at least one other partition, such that the partitions transfer data from a source to a destination in a parallel manner, and such that if one switch control mechanism fails, a connection provided by one or more routes supported by remaining switch control mechanisms will remain active to continue to transfer data.

The methods and arrangements of the invention are preferably implemented primarily by computer software and hardware mechanisms within a data communications device apparatus. As such, other embodiments of the invention include a computer program product having a computer-readable medium including computer program logic encoded thereon for transferring data through a data communications device. The computer program logic, when executed on at least one processing unit with the data communications device, causes the at least one processing unit to perform the techniques outlined above, as well as all operations discussed herein that can be performed by software program(s) executing on computer hardware. In other words, these arrangements of the invention are generally manufactured as a computer program stored on a disk or other such media that can be loaded into a computer or data communications device to make the device perform according to the operations of the invention.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 1 illustrates an example of a prior art connection-based network such as a switch network.

FIG. 2 illustrates an example of a prior art connectionless network such as an IP network.

FIG. 3 illustrates how a prior art connection-based network of switches can be configured to operate as a connectionless network through the use of prior art Label Switch Router technology.

FIG. 4 illustrates how prior art label switch routers provide a single IP network within a connection-based switch network.

FIG. 5A illustrates how a prior art route controller within a label switch router is able to control a data switch in order to provide a connectionless IP network capability over a connection-based network.

FIG. 5B illustrates an IP address/Label table maintained by a prior art route controller within a label switch router.

FIG. 5C illustrates a Label/Outgoing Interface table also maintained by a prior art route controller within a Label Switch router.

FIG. 6 illustrates the architecture of a label switch router (LSR) configured according to embodiments of the invention.

FIG. 7 illustrates an arrangement of an LSR providing a fully meshed architecture according to one embodiment of the invention.

FIG. 8 illustrates an arrangement of an LSR providing a fully parallel architecture according to another embodiment of the invention.

FIG. 9 illustrates an interface arrangement between label switch controllers and resources in the data switch of an LSR configured according to the fully meshed architecture of the invention.

FIG. 10 illustrates an alternative interface arrangement between label switch controllers and resources in the data switch of an LSR configured according to the fully parallel architecture of the invention.

FIG. 11 illustrates the relationship that exists between logical and physical interfaces between a data switch and two independently operating label switch controllers in an LSR configured according to the invention.

FIG. 12 illustrates processes involved in an implementation of an LSR having two label switch controllers configured according to the fully meshed architecture of the invention.

FIG. 13 illustrates processes involved in an implementation of an LSR having two label switch controllers configured according to the fully parallel architecture of the invention.

FIG. 14A illustrates a label switch router operating in a non-failure state according to the invention using multipath routing to provide two concurrently and independently operating parallel IP networks.

FIG. 14B illustrates how the failure of one label switch controller can be compensated for by the concurrently operating redundant label switch controller that provides another parallel IP network to handle data transfers formerly handled by the failed network in the multipath routing implementation.

FIG. 15A illustrates a label switch router operating in a non-failure state according to the invention which provide two concurrently and independently operating LSCs that provide parallel routes, one of which has been selected for data transfer using a unipath routing protocol.

FIG. 15B illustrates how the failure of one label switch controller can be compensated for by the concurrently operating redundant label switch controller that provides another parallel route that can be selected for data transfer using a unipath routing protocol.

FIG. 16 illustrates how a plurality of label switch routers, each having a plurality of label switch controllers paired with respective switch resource partitions, can provide a plurality of parallel IP routes according to the invention.

FIG. 17A illustrates an example of the connectivity between two label edge routers and two ATM switches configured as label switch routers using the architecture of the invention.

FIG. 17B illustrates the various corresponding parallel IP networks provided by the network configuration shown in FIG. 17A.

FIG. 18 is a flow chart showing the steps performed during the general operation of a label edge router configured according to the invention.

FIG. 19 is a flow chart showing the steps performed during the general operation of a label switch router configured according to the invention.

DETAILED DESCRIPTION OF PREFERRED EMBODIMENTS

General Overview of the Invention

As summarized above, the present invention provides unique architectures and techniques for routing redundancy in a data switch configured to use label switching or MPLS technology. Generally, as will be explained in more detail, the system of the invention uses multiple label switch controllers (LSCs) that can each operate independently of each other to control resources in the data switch. By providing multiple, similarly configured label switch controllers that each establish respective similar routes for labeled data (e.g., labeled ATM cells) within a data switching mechanism, redundancy is provided for route controllers and, if using multipath routing, multiple parallel IP networks are provided. The combination of multiple LSCs concurrently operating on a single data switch mechanism according to this invention is called a label switch router (LSR).

Since each LSC in an LSR provides the capability to support a distinct, but parallel network (set of routes) in relation to the others, the invention can use multipath routing techniques to distribute, for example, a stream of data equally across each of the parallel network routes. The invention thus allows the operation of multiple parallel networks through individual switching mechanisms.

In an alternative arrangement, each LSC concurrently offers the parallel routes in relation to the others, but unipath routing is used to select only a subset of all routes available. For example, only the route(s) offered by one LSC may be chosen using unipath routing, while the same parallel route (s) offered by the other redundant LSCs are not selected for use at that time, but can be used in the event of a failure.

In the event of a failure of one of the LSCs (and thus a diminished data transfer capacity of one of the parallel network routes) using either the multipath or the unipath routing implementations, data transfer is still available and is provided from the other parallel network routes still supported by other non-failed LSCs. In the case of the multipath routing implementation, all LSCs having similarly configured routes merely continue to handle data transfer operations, just as they were before the LSC failure. No LSC reconfiguration is needed and switch resources used by the failed LSC are released for use by other connections supporting parallel routes in the switch.

In the case of an LSC failure when using the unipath routing implementation, the unipath routing protocol selects another parallel route concurrently offered by one of the remaining (i.e., non-failed) LSCs. Upon selection of the new route, connections in the switch mechanism are established and data transfer is performed using the newly selected route. The LSC supporting the newly selected route does not need to obtain connection or state information from the failed LSC, making the changeover from one route to another quite simple.

In both implementations (using multipath or unipath routing), switch resources such as bandwidth that were used by the failed LSC can be made available to the remaining non-failed LSCs. Since each LSC maintains similar route and connection state information, in the event of a failed LSC, there is also no need to reconfigure the other LSC(s) or obtain failover or state information from the failed LSC. Thus, failures are handled gracefully without significantly diminished network capacity. Since the multipath implementation allows parallel networks to operate simultaneously, little or no data loss is experienced if it is used as explained herein.

Example of General Architecture and Operation

FIG. 6 illustrates an example of the general architecture of the invention that provides parallel networks in a label switch router (LSR) 200 configured according to the invention. FIG. 6 is useful in providing a high level overview of the basic architecture and operation of various arrangements and implementations of the invention, before more detailed and complex arrangements of the invention are presented later.

In FIG. 6, the Label Switch Router 200 includes a plurality of switch control mechanisms 201-1 through 201-N (where N is equal to two or more) each coupled via a switch control interface 220 to a data switching mechanism 205. The switch control interface 220 may be a virtual switch interface, a General Switch Management Protocol, or a similar interface allowing a switch to be controlled by another processing device. The data switching mechanism 205 may be, for example, an ATM switch such as a Cisco StrataCom BPX manufactured by Cisco Systems, Inc. of San Jose Calif. or a LightStream-1010 ATM switch.

Each switch control mechanism 201 concurrently and independently implements a routing and label distribution protocol to control certain resources within the data switching mechanism 205, thus providing a respective one of the data networks 230-1 through 230-N. In a preferred embodiment, each switch control mechanism 201 is a label switch controller (LSC) that implements MPLS technology using a label distribution protocol such as LDP in conjunction with a routing protocol such as OSPF to control (e.g., route) the flow of data packets in the form of labeled data portions, such as labeled ATM cells, within the data switching mechanism 205. Preferably, each LSC 201 is of the same type and is configured to operate the same protocols in a similar manner. Such an arrangement provides the ability to transfer IP data packets between the connectionless networks 212 and 213 using the LSR 200.

Details of the steps of operation of the system of the invention will be described more fully with respect to the flow charts in FIGS. 18 and 19. For now, a high level description of the functioning of the invention will help in understanding the architectures presented thereafter.

During the operation of LSR 200, each LSC 201-1 through 201-N supports and advertises a respective route for one of the network paths 230-1 through 230-N. The routes are the same for each LSC, and thus are parallel with each other with respect to a particular destination. Within the label edge routers (LERs) 210, 211, the parallel routes provided by each LSC 201 are "seen" as respective parallel data networks 230-1 through 230-N. This particular example illustrates at least three IP networks 230-1 through 230-N that are concurrently operational with each other. This specific illustrated example of the invention uses an implementation of an multipath routing protocol in which each route (i.e., each network 230-1 through 230-3-N through the data switching mechanism 205) "seen" by an LER 210, 211 is given an equal weight or cost. This allows data traffic (IP packets in this example) that is bound for the same destination IP address (e.g., from label edge router 210 through label switch router 200 to label edge router 211) to be divided more or less equally across the parallel routes (e.g., the parallel networks 230-1 through 230-N) during normal operation, when all of the switch control mechanisms 201 are functioning properly (i.e., when they all offer a route for data).

Since each switch control mechanism 201 operates concurrently to provide a respective parallel IP data network 230 (routes which may be offered on physically separate data links using separate ports, or which may be provided as logically separate networks on one or more shared ports, as will be explained), fault tolerance and redundancy are achieved should one or more of the switch control mechanisms (e.g., one of 201-1 through 201-N) fail. In the event of such a failure (e.g., failure of 201-1), some or all of the remaining concurrently functioning switch control mechanisms 201-2 through 201-N can support the transfer of IP data formerly handled by the failed switch control mechanism 201-1.

Using this arrangement, failures of an LSC 201 are gracefully handled by the invention since multipath routing assigns the same cost or weight metric to each network 230-1 through 230-N when the parallel routes (similar network paths provided by each LSC 201) are established. This allows data transfers to take place concurrently across all routes for a particular destination address. Within the LSR 200, the separate but parallel routes (e.g., the parallel network paths 230-1 through 230-N through the data switching mechanism 205) each correspond to a respective connection in the data switching mechanism 205. Since the parallel connections are concurrently used to provide data transfers for the parallel routes using multipath routing, the connections are essentially duplicates of each other, and during operation they share resources of the data switching mechanism 205 such as bandwidth, processor cycles, memory, buffers and so forth equally. As such, when one LSC fails (e.g., 201-1), connections for the other networks 230-2 through 230-N (e.g., for the other parallel routes) supported by the other non-failed LSCs 201-2 through 201-N continue to operate. The remaining connections share the data load formerly handled by the failed LSC 201-1 and its failed IP network 230-1 (i.e., failed route).

More specifically, when an LSC 201 fails, its routes are no longer advertised. This is detected in the data switching mechanism 205, as will be explained, and the connections supporting the non-existent routes are removed from the data switching mechanism 205. This allows any resources formerly allocated to the failed routes (i.e., resources used by the removed connections) to be used by the remaining parallel connections still in operation. The label edge routers 210, 211 also can detect the disappearance of the route formerly offered (advertised) by the failed LSC 201-1 and can remove the failed route from the list of available (e.g., equal cost) routes used by the multipath routing protocol. Essentially, because of the LSC failure, there is no longer a valid route through the LSR 200. As such, data is no longer distributed over the failed route. The other remaining routes will thus handle any data that formerly would have been sent over the failed route.

In this manner, the redundant LSC architecture and operation of the invention provides a high threshold against total failure, since the parallel data paths operate independently of each other within each LSR 200. Moreover, when the architecture of the invention is used with a multipath routing protocol, a failure of one LSC 201 does not require another to be brought up into an operational mode (as in warm or hot standby failure schemes) since each LSC 201 is already fully operational.

According to another implementation of the invention, the design uses unipath routing instead of multipath routing. The operation of this arrangement is somewhat different that the multipath configuration explained above. In the unipath arrangement, each LSC 201 remains concurrently and independently active with respect to the others, and each advertises it's available route(s). However, the LERs 210, 211 use unipath routing to select only one of the available routes for data transfer. In other words, only one of the networks 230-1 through 230-N is selected to support data transfers. Once a route is selected, a connection is established by the associated LSC 201 in the data switching mechanism 205 to support this route. This connection is able to use most of the resources in the data switching mechanism 205 such as bandwidth, processing cycles, and so forth to perform data transfers. Generally, if the unipath implementation of the invention were illustrated in FIG. 6, only one of the parallel data networks 230-1 through 230-N would be operational at any point in time.

In the event of a failure of the LSC 201 supporting the operational route, the LERs 210, 211 detect the disappearance of the route and therefore deduce a failure of the LSC 201. As such, the LERs 210, 211 re-analyze the network for a new set of routes. During this process, they again consider the other routes provided/advertised by each of the non-failed LSCs 201 that continue to operate normally. The LERs 210, 211 then select another route provided by another LSC 201. Since the LSC 201 supporting the newly selected route is already participating in the same routing and label distribution protocols as the LERs 210, 211, the LSC 201 rapidly learns that the route it supports is to be used. Then, only a connection needs to be established in the data switching mechanism 205 to support the newly selected route. Once established, the LERs 210, 211 can use the new route for data transfers. Resources consumed by the route formerly supported by the failed LSC are generally released upon failure, and can be used by the newly selected route.

In this manner, the system of the invention can use unipath routing to provide redundancy, but requires a short time during re-routing to select a new route and establish a new connection to support this route. However, since each LSC 201 is configured from the start with parallel routes, the LSC 201 supporting the newly selected route does not have to receive state information from the failed LSC.

Label Switch Router Architecture of the Invention

Generally, there are two main architectures of a label switch router configured according to the invention: A fully-meshed architecture (example illustrated in FIG. 7) and a fully-parallel architecture (example illustrated in FIG. 8). Each of these architectures can operate as explained in the above example.

Fully Meshed Architecture

FIG. 7 illustrates an example design of a label switch router (LSR) 200 configured according to one embodiment of the invention. The LSR 200 includes N label switch controllers (LSCs) 201-1 through 201-N coupled via N respective switch control interfaces 220-1 through 220-N to N respective switch resource partitions 240-1 through 240-N, which in turn each couple to M network ports 225. The LSCs 201-1 through 201-N each implement MPLS technology (i.e., each operate a label distribution protocol such as LDP and a routing protocol such as OSPF) and maintain control of a respective switch resource partition 240-1 through 240-N. The switch resource partitions 240 represent an amount of resources that may include connections, memory, buffers, queues, processes and or circuitry within the data switching mechanism 205 (FIG. 6) that are associated with each LSC 201. The resource in a switch resource partition 240 are generally not fixed. Rather, it is quite possible that data switch resources can be dynamically shared between the various partitions 240. In this sense, the term partition is not meant to exclude the meaning of a general sharing of data switch resources between LSCs. Thus, the amount of resources under control or associated with the route or routes offered of a single LSC 201 is that LSC's partition at any one point in time, and this amount of resources and the partitions contents (particular switch resources in use) may dynamically change or may be statically fixed, or may change and then be fixed in a repeating manner at different periods of time. When a partition 240 is used to provide a route (e.g., one of the networks 230-1 through 230-N in FIG. 6) supported by one of the LSCs 201, the partition 240 includes a connection in the form of a labeled virtual circuit to provide data transfers between the ports 225.

The configuration of the label switch router 200 in FIG. 7 is called a "fully meshed" architecture. This is because each switch resource partition 240-1 through 240-N (controlled by a respective LSC 201-1 through 201-N) can implement a separate network (e.g. one of 230-1 through 230-N in FIG. 6) by sharing one or more or all M network ports 225 of the data switching mechanism 205 with the other parallel networks 230. For example, in this illustration, the switch resource partition 240-1 represents an apportionment of resources within the data switching mechanism 205 (FIG. 6) (an ATM switch in this example) that provides an amount of bandwidth over each port 225 (ports 1 through M)

to support the data network 230-1, which corresponds to a route supported by LSC 201-1.

If the fully-meshed architecture is used in combination with multipath routing, the combinations of respectively paired LSCs 201 and switch resource partitions 240 can each concurrently provide a respective data network over each of the M network ports 225. Each LSC 201 controls a some of the bandwidth on any port 225-1 through 225-M required for a route in a network 230 across the fully-meshed architecture. For instance, the LSC 201-1 may independently support IP network 230-1 (using MPLS technology) to provide connectionless data transfer capabilities via the M network ports 225, while LSC 201-2 may support routes for a similar parallel network using connections and resources provided within its respective switch resource partition 240-2 across the same ports 225 1–M. Multipath routing allows parallel networks 230-1 through 230-N to be concurrently supported by other LSCs 201-2 through 201-N using other switch resource partitions 240-2 through 240-N which share bandwidth across all ports 225 (for the fully meshed architecture) in a similar manner.

If an implementation of a unipath routing protocol is used, then for each destination, only one of the switch resource partitions 240-1 through 240-N contains a connection supporting the route offered by only one of the LSCs 201 to that destination. For instance, if the unipath routing protocol selects a particular route supported by LSC 202-1 (e.g., selected network 230-1 for data transfer), only switch resource partition 240-1 will have an established connection (e.g., LVC) in place during operation to support the selected route. In the case that there is only one destination, the switch resource partition 240-1 is able to dynamically use most of the resources of the data switching mechanism 205 to support data transfer for network 230-1, including any needed bandwidth on each of the ports 1 through M 225. The other LSCs 201-2 through 201-N still maintain control over a small amount of switch resources in order to continue to advertise their routes, but connections to this destination and thus the networks 230-2 through 230-N are not established in the associated partitions 240-2 through 240-N. In general, there are many destinations and so connections will be used in all partitions 240-1 through 240-N controlled by all LSCs 201-1 through 201-N. However, for each specific destination, only one connection is used.

Fully Parallel Architecture

FIG. 8 illustrates another architecture of a label switch router (LSR) 200 configured according to the invention. The design of the LSR 200 in FIG. 8 is called a fully parallel architecture. In this design, the individual LSCs 201-1 through 201-N paired with respective switch resource partitions 240-1 through 240-N also provide independent and parallel data routes (e.g., networks 230-1 through 230-N in FIG. 6). However, the connection of the switch resource partitions 240 to the network ports 225 is somewhat different. In the fully parallel LSR 200 configuration, each switch resource partition 240-1 through 240-N uses a respective and exclusive set of network ports 225 for data transfers. Thus, each parallel route supporting networks 230-1 through 230-N (FIG. 6) is supported not only by a separate LSC 201 and a respective separate switch resource partition 240, but also by a separate set of network ports 225.

Though either multipath or unipath routing can be used with either the fully-meshed (FIG. 7) or fully-parallel (FIG. 8) designs, the fully-parallel design (FIG. 8) is preferred when using multipath routing, since the design provides for physically separate fully parallel concurrently operating networks 230, whereas the fully meshed design provides logically parallel networks that concurrently transfer data over that same shared physical data links (via sharing ports 225 1–M). Since the fully parallel design using multipath routing provides separate groups of ports 225 for exclusive use by each respective network 230-1 through 230-N, there is no contention for bandwidth on ports 225 between networks 230.

On the other hand, the fully-meshed design (FIG. 7) works well with unipath routing. This is because unipath routing selects only one route supported by one LSC 201 for use in data transfers. As such, the connection (i.e., the network path 230) established for the route has access to the full bandwidth of all ports 1 through M 225 of the LSR 200 in the fully meshed design, with no contention with other routes supported by other LSCs 201.

It is to be understood by those skilled in the art that the example architectures shown in FIGS. 7 and 8 are not meant to be limiting to the invention. As such, combination of fully-meshed and fully-parallel designs are possible, while still achieving redundant LSC operation. For instance, a design in which some LSC 201/switch resource partition 240 pairs are configured in a fully-meshed design to access all ports, while others are coupled to access selected sets of ports is within the scope of the invention. Moreover, the number of LSCs 201 configured to operate concurrently with a switch is not limited to two or three.

Fully-Meshed LSC to Data Switching Mechanism Interface

FIG. 9 illustrates details of the switch control interface 220 configured in a fully-meshed architecture for each LSC 201 in an LSR 200. The fully-meshed interface configuration in FIG. 9 corresponds to, and operates in conjunction with the fully-meshed LSR architecture discussed in relation to FIG. 7. In this specific example configuration, the switch control interface 220 is a virtual switch interface (VSI) (also labeled as 220 for these examples) which allows a plurality of LSCs 201 to interface to and configure connections within a single data switching mechanism 205 (FIG. 6).

In general, a single VSI 220 between an LSC 201 and a switch resource partition 240 includes a VSI-Master process 232 which communicates with one or more VSI slave process(es) 241. A VSI-Master process 232 executes within each LSC 201. The VSI-Slave processes 241-1 through 241-N, under instruction form the VSI-Master process 232, execute within the data switching mechanism 205 to manipulate partition resources to provide labeled virtual circuits (i.e., connections, not specifically shown) and port bandwidth for routes.

In the fully-meshed VSI architecture in FIG. 9, each LSC 201-1 through 201-N includes one VSI-Master process 232 which controls a set of M VSI-Slave processes 241, with one slave for each port 225 (hence M slaves). There are thus N separate parallel routes (one for each LSC 201) that may be supported equally across the M separate ports 225 in this architecture. Each VSI-Slave process 241-1 through 241-M works in conjunction with the data switch resource management process 250 (which allocates resources such as port bandwidth between the partitions 240 in FIG. 7) to handle routing requirements by establishing label virtual circuits for it's associated port 225, if needed. That is, each VSI-Slave process 241-1 through 241-M manages a portion of each switch resource partition 240-1 through 240-N. The portions corresponds to the data transfers and/or bandwidth requirements for the partitions 240 for a single port 225. Each VSI-Master 232-1 through 232-N communicates with each VSI-Slave 241-1 through 241-M to allow a particular VSI-Master 232 to control to control only the resources in its assigned partition 240. The amounts of port 225 bandwidth and data switch resources 205 under control of each VSI-Slave process 241 that are under control of a single VSI-Master process 232 corresponds to that VSI-Masters 232 (i.e., that LSCs 201) switch resource partition 240.

The fully-meshed interface design in FIG. 9 allows each LSC 201-1 through 201-N to support a route over each port 225, and allows access to bandwidth on all ports 225 if required. For implementations that use multipath routing, the routes may share port bandwidth with other parallel routes of other LSCs 201, whereas in unipath implementations, the selected route has access to the majority of the bandwidth on each port 225.

Fully-Parallel LSC to Data Switching Mechanism Interface

FIG. 10 illustrates a fully parallel virtual switch interface configuration that can operate in conjunction with the fully parallel design architecture of the LSR 200 previously illustrated and discussed with respect to FIG. 8. Due to drawing space limitations, the example architecture in FIG. 10 only shows two LSCs 201-1 and 201-2, while FIG. 8 illustrates the design of the LSR 200 with N LSCs 201 (201-1 through 201-N). The invention is not limited to the example in FIG. 10, and thus two, three or N LSCs 201 can be configured in the manners described. In this parallel design, since there are two LSCs 201, the M ports 225 in the data switching mechanism 205 (FIG. 6) are divided into two groups. The LSC 201-1 supports routes for the data network 230-1 that can transfer data over ports 225-1 through 225-M/2, while the LSC2 201-2 supports routes for the data network 230-2 for data transfer over ports 225-(M/2+1) through 225-M. This allows each LSC 201 in FIG. 10 to support routes using physically separate network links (i.e., coupled to ports 225) with respect to the other.

Just as explained above, each LSC 201 operates a respective VSI-Master process 232. In the fully parallel design however, each VSI-Master process 232 maintains control over a respective set of VSI slave processes (e.g., 241-1 through 241-M/2 for VSI-Master 232-1, and 241 -M/2+1 through 241-M for VSI-Master 232-2, in this example). Each respective VSI-Slave process 241 is assigned control of the resources for one of the ports 225 in the set assigned to the respective LSC 201 (e.g., VSI-Master 232-1 controls VSI-Slave 241-1 which control resources (e.g., bandwidth) for port 225-1).

As noted above, the fully parallel architecture favors operation using multipath routing. Since multipath routing allows the routes (i.e., the paths for networks 230-1 through 230-N) offered by both LSCs 201-1, 201-2 to each have active connections supporting the routes, should either an LSC 201 or a port 225 supporting a particular route fail, the other networks/routes supported by other LSCs 201 using other sets of ports 225 will remain unaffected. This extra measure of redundancy offered by the fully parallel configuration provides near zero switch down time with no loss of data in event of failures. Fault tolerances are thus suitable for the invention to be used in highly reliable networking situations that handle such applications as voice transmissions on public switch telephone networks.

Physical/Logical LSC to Switch Interfaces

FIG. 11 illustrates an example of the logical and physical interfaces for an LSR 200 including a data switching mechanism 205 controlled by two LSCs 201-1 and 201-2 in a fully-meshed configuration. This example illustrates the configuration of the data switching mechanism 205 for just two physical ports 225-1 and 225-2. The ports 225 may be, for example, ATM ports and the data switching mechanism 205 may be an ATM switch. Data may be transmitted and received as ATM cells over each port 225. As explained previously, the fully meshed configuration allows each LSC 201-1, 201-2 to support a route over each port 225-1, 225-2 (either simultaneously using multipath routing, or at different time using unipath routing). As such, each VSI-Master process 232-1, 232-2 in each LSC 201-1, 201-2 controls two VSI-Slave processes 241-1, 241-2. Master/Slave control is provided by the VSI interfaces 220-1A, 220-1B (for LSC 201-1) and 220-2A, 220-2B (for LSC 201-2) as illustrated. Thus, a physical VSI interface 220 that exists between an LSC 201 and the data switching mechanism 205 may be logically divided between respective VSI-Slave processes 241.

The VSI-Slave process 241-1 controls the resources (i.e., bandwidth, port data transfer capabilities, virtual circuit capacity, etc.) for port 225-1, while the VSI-Slave process 241-2 controls the resources for port 225-2. The data switch resource management facilities 250 can configure the VSI-Slave processes 241 and may also configure the ports 225 themselves to assign resources to various partitions. This control function is represented by control links 251. Since this example illustrates the fully-meshed configuration when using multipath routing (since each LSC 201 has access to bandwidth on each port 225 at the same time) each LSC 201-1 and 201-2 can support a network of independent and concurrently operating paths to each destination over each port 225-1, 225-2 (i.e., each LSC 201-1, 201-2 shares some of the available bandwidth on each port 225). The ports 225-1, 225-2 are thus illustrated in a partitioned manner to include logical ports 225-1A, 225-1B (for port 225-1) and logical ports 225-2A and 225-2B (for port 225-2). When both LSCs 201 are functioning properly, the LSC 201-1 establishes routes resulting in establishment of connections that transfer data over ports 225-1A, 225-2A (supporting the first independently operating data network 230-1), while the LSC 201-2 supports routes that result in connections that perform data transfers over logical ports 225-1B, 225-2B (supporting the second concurrently and independently operating data network 230-2).

Though, in this example, each port 225 is an ATM port and transfers data using ATM cells (not shown), since LVCs (not specifically shown) are established between the ports 225 according to routes required by the respective VSI-Slaves 241-1, 241-2, which are under control of their respective VSI-Masters 232-1, 232-2, the LSCs 201-1 and 201-2 have. ultimate control of the routing of data over the ports 225 using MPLS technology. Accordingly, using MPLS technology, each LSC 201-1, 201-2 can reference and route data (e.g. IP packets) that is received via labeled ATM cells transferred through the data switching mechanism 205. This routing capability is represented by the logical XMPLS interfaces 271 through 274. For example, XMPLS interfaces 271, 272 represent the ability of LSC 201-1 to route data transmitted and/or received via labeled ATM cells (using label switching technology) over the logical ports 225-1A, 225-2A.

While the interfaces in FIG. 11 are described in relation the fully-meshed configuration using multipath routing, it is to be understood that other variations using unipath routing and the fully-parallel design are contemplated herein as being within the scope of the present invention. For instance, in a configuration using unipath routing with the fully meshed interface configuration of FIG. 11, for each destination, only the route offered by one of the LSCs 201 is selected for use at one time by an LER 210, 211 (FIG. 6). In this case, for each destination, only one set of VSI and XMPLS interfaces (i.e., the set 220-1A, 220-1B, 271, 272 or the set 220-2A, 220-2B, 273, 274) would be active. In the case where there are a large number of destinations and routes, more or less alternate sets of interfaces would be used so that resources were used more or less equally by the partitions. However, if unipath routing is used and there is only one destination with one selected route, then the bandwidth on ports 225-1 and 225-2 would be fully available for data transfers for the selected route. In the fully parallel configuration, the LSCs 201 would not share ports 225, as illustrated in FIG. 11. Rather, each LSC 201 would have its own set of ports 225 for use, and thus only one VSI interface would exist between the VSI-Slave 241 for a port and is LSC 201.

The LSC redundancy shown in FIG. 11 provides greatly enhanced fault tolerance when both LSCs 201-1, 201-2 are operating concurrently (using multipath routing). Failures of an LSC allow the other to continue to perform data transfers. Suppose LSC 201-1 fails in some manner, meaning that it can no longer provide a route for data transfers on network 230-1 (supported by logical sub-ports 225-1A, 225-2A and XMPLS interfaces 271, 272). The failure will be detected by the LERs 210, 211 using mechanisms within the routing protocol for instance. As such, the LERs 210, 211 will cease transmitting data on the failed parallel network 230-1. Multipath routing interprets the failure as causing a failure of the data path 230-1 controlled by the LSC 201-1, and hence the routing protocol distributes data traffic (labeled ATM cells in this example) onto the other concurrently operating parallel data networks 230-2 through 230-N (just 230-2 in this example using two LSCs). The data switch resource management processing 250 allows resources released due to the failure, such as those used by the failed sub-ports 225-1A, 225-2A, to be distributed to other processes requiring the resources for data transfers (e.g., sub-ports 225-1B, 225-2B).

In a similar manner, unipath routing can operate to detect such a failure of an operational LSC 201 and in response thereto, can select a parallel route advertised by a non-failed LSC. Once the new route is selected, connections can be established for the newly selected route supporting network 230-2 and data transfers can commence. In either case, the failed LSC does not need to provide state or connection information so that another LSC can take over. This saves the need to periodically cache state information in a safe area in the event of component failures, as frequently occurs in conventional hot or warm standby redundant systems.

LSC Processing for Fully-Meshed Design

FIG. 12 provides a more detailed illustration of the processes used by the LSCs 201-1 and 201-2 to support two concurrently operating IP data networks 230-1, 230-2 in a fully meshed configuration shown in this example using multipath routing. FIG. 12 also demonstrates how the resources of a switch 205 and its ports 225 can be divided to support parallel networks 230-1 and 230-2.

In FIG. 12, each LSC 201-1, 201-2 is configured in a similar manner to include the following: a label distribution process (LDP) 350-1, 350-2; a set of virtual path identifier (VPI)/virtual circuit identifier (VCI) tables 351-1, 351-2 which maintain an identity of the required label virtual circuits (LVCs) established in the data switching mechanism 205 for data transfers; a routing process (e.g., OSPF, BGP) 352-1, 352-2; a port mapper process 353-1, 353-2; and a respective VSI-Master process 232-1, 232-2. The label distribution processes (LDP) 350-1, 350-2 implement the LDP protocol which allows labeled ATM cells to transport connectionless types of data, such as IP packets. The route processes 352-1, 352-2 implement a standard routing protocol such as OSPF which is used to route the labeled cells. The combination of these processes is used to configure a set of label virtual circuits (LVCs) (i.e., connections) in the data switch 205 which transmit data.

For example, each LVC used for the transmission of IP data comprises a path that IP packets are to take based on their IP address, which is indicated as a virtual path identifier (VPI), and the virtual circuit identifier (VCI) indicating a label virtual circuit (i.e., a connection) within the data switching mechanism 205 that provides the proper route or data path. The VPI and VCI information is maintained and adjusted as needed by a routing protocol process 352 in conjunction with an LDP process 350 the to provide connections needed for various required IP routes. The port mapper processes 354 are used to indicate to the LDP and routing processes 350, 352 which ports 225 are currently available for use.

This simple example in FIG. 12 illustrates how two LSCs 201-1, 201-2 can operate IP networks by sharing a single port 225-1 in the fully meshed configuration. That is, this example illustrates the fully-meshed configuration for a single port 225-1, which receives data from the left, processes and routes data, and forwards the data to the right to one of the other ports 225-1 through 225-M. It is to be understood that typically, a port 225 can serve both as an input to receive data from the network and as a mechanism to output data to the network, and that the illustration is meant to convey how resources associated with a single port 225-1 can be partitioned to support routes for multiple data networks 230-1, 230-2. Other ports 225 would be configured in a similar manner using other partitions 240.

In the fully-meshed configuration, the VSI-Slave process 241-1 under control of separate VSI-Masters 232-1, 232-2, controls respectively separate VCI/VPI and bandwidth partitions 240-1, 240-2 for the port 225-1. Generally, the VCI/VPI and bandwidth partitions 1 and 2 (240-1, 240-2) are included in the switch resource partitions 240-1, 240-2 associated with the LSCs 201-1, 201-2, as illustrated in previous figures. If a partition 240-1, 240-2 includes a connection, it is able to use a share of the bandwidth on the port 225-1. When using a multipath routing protocol, the partitions 240-1, 240-2 provide connections for two separate IP data networks 230-1, 230-2 which operate concurrently over the same port 225-1. In the case of unipath routing, one of the partitions 240-1, 240-2 may provide a connection with access to most of the bandwidth on the port to support the single route selected by the LERs 210, 211 (FIG. 6). The other partition (the other of 240-1, 240-2 supporting the non selected route) still exists in order to continue to allow the other LSC 201 (the one supporting the non-selected route) to support an available route within the data switch mechanism 205, though no connections exist for each route until the route is selected for use. Even when unipath routing is used, may often be the case, that there are many destinations. Although only one path is chosen to each destination (in unipath routing), the many paths to the many destinations tend to be more or less evenly distributed amongst partitions in this example embodiment. Thus, multiple data networks (e.g. 230-1 through 230-N) provided by the invention may use the same switch and port resources and physical data links.

The illustrated example embodiment describes a switch architecture in which resources are allocated on a port-by-port basis. In is to understood by those skilled in the art that such an architecture also works with switches where some or all of the resources are allocated across the entire switch. In such an embodiment, the switch resource management process 250 can allocate some resources to the partitions 240 on a switch wide basis, rather than a port-by-port basis.

LSC Processing for Fully-Parallel Design

FIG. 13 illustrates the configuration of processes for two LSCs 201-1, 201-2 that control a data switching mechanism 205 in a fully parallel configuration. The processes 350 through 354 in each LSC 201-1, 201-2 in FIG. 13 were explained with respect to FIG. 12, and will not be discussed again here. Of particular importance in FIG. 13 is the fully parallel configuration, in which each LSC 201-1, 201-2 can implement a distinct data network 230-1, 230-2 using separate ports 225. This particular example shows the partition configuration for the single ports 225-1 and 225-(M/2+1) (where M is the total number of ports in the switch and there are two LSCs), each supporting routes for one of the two networks 230-1, 230-2. Using multipath routing both networks 230-1 and 230-2 can concurrently operate. Thus, port 225-1 is used to support network 230-1, while port 225-(M/2+1) (which is the first port of the second set of ports used for the second concurrently operating network) is shown to support routes for network 230-2. As noted above, only two ports are shown in this illustration. Thus, ports 225-2 through 225-M/2, which are also used to support the first IP network 230-1 are configured in a similar manner as port 225-1 (but with separate partitions 240), and ports 225-(M/2+2) through 225-M would be configured much like the port 225-(M/2+1) shown in this figure.

As illustrated in this embodiment, for the ports 225-1 and 225-(M/2+1) that are each associated with a respective parallel network 230-1, 230-2, separate VPI/VCI and bandwidth partitions 240-1, 240-2 are controlled by respective VSI-Slave processes 241-1, 241-2, one per port 225. Accordingly, using multipath routing, routes for each network 230-1, 230-2 (maintained respectively by each LSC 201-1, 201-2) can have full utilization of the bandwidth on the ports 225 assigned to that network. This contrasts with the fully-meshed embodiment of the invention in FIG. 12 in which ports 225 are shared by concurrently operating networks 230 that handle data transfers using multipath routing. The fully parallel configuration in FIG. 13 provides a further measure of redundancy since a port failure (e.g., failure of port 225-1 affecting IP data network 230-1) will still allow the other networks 230-2 through 230-N (one network for each LSC, with only two illustrated in this example) to operate seamlessly. Such seamless operation occurs concurrently in multipath implementations, and can occur with one route being selected for operation upon failure of another parallel route for a particular destination in the unipath implementation.

LSC Failover Operations

As has been discussed, the invention provides a unique design for LSC redundancy. LSC failover operations, where one route or set of routes provided by one LSC 201 are use to handle data transfers formerly handled by a failed route or set of routes formerly supported by a failed LSC 201, will now be explained with respect to both multipath (FIGS. 14A and 14B) and unipath (FIGS. 15A and 15B) protocols, as each implementation handles such failovers somewhat differently.

LSC Failover Using Multipath Routing

Using a fully parallel configuration and an implementation of multipath routing, FIG. 14A illustrates the normal flow of data over separate IP networks 230-1, 230-2 from a label edge router 210 through an LSR 200 to another label edge router 211. FIG. 14B, which will be explained shortly, will be used in conjunction with FIG. 14A to explain how the invention provides re-route recovery for data in the event of a failure of LSC 201-1 in LSR 200. These examples are provided in the context of a fully-parallel configuration, though the principles of route recovery apply in a similar manner to a fully-meshed configuration.

In FIG. 14A, the first data network 230-1 containing links (e.g., 230-1-1, 230-1-2) is supported between the LERs 210, 211 by the LSC 201-1 which provides a route(s) that uses resources (i.e., bandwidth) in switch resource partition 240-1 in the LSR 200 for each particular link destination. In this example, for the first links (e.g., 230-1-1) in the first network 230-1, data is transmitted from network port 225-0 in the LER 210, through the LSR 200 (through ports 225-1, 225-2) to the port 225-3 in LER 211. Links (e.g., 230-2-1, 230-2-2) in the second network 230-2 are concurrently supported in a similar manner via LSC 201-2 and partition 240-2 of the LSR 200 for similar respective destinations. As such, for the second links (e.g., 230-2-1, 230-2-2), data is transmitted from the network port 225-4 in the LER 210, through the LSR 200 (through ports 225-5, 225-6) to the port 225-7 in LER 211. For all links (e.g., 230-1-1, 230-1-2, 230-2-1, 230-2-2) in both networks 230-1, 230-2, a weight or cost metric (shown in parentheses at each port 225, for this example) is assigned. In this example, and under normal operation as illustrated in FIG. 14A, each port 225 has a weight or cost metric value of one, shown by the "(1W)." The cost metric is the cost or weight given to each network link (e.g., 230-1-1, 230-2-1) by a network administrator, for example. This metric information can be used by the multipath routing protocol in order to select routes. Since each link in each network 230-1, 230-2 is given the same cost metric of one and the networks 230-1 and 230-2 are identical in shape or topology, data is divided more or less equally between the two networks 230-1, 230-2 when transmitted, for example, from the LER 210.

The routing algorithm operating in each LSC 201-1, 201-2 detects the equivalent network paths and routing information for data to reach various destinations. As such, the LSCs 201-1, 201-2 in the LSR 200 establish connection paths which can equally handle the transfer of the data via control of the switch resource partitions 240-1, 240-2. In this example, data (e.g., labeled ATM cells) sent from LER 210 that is bound for LER 211 must use LSR 200 as its next hop. As such, LER 210 has multiple paths in the form of multiple parallel IP networks 230-1, 230-2 to chose from to get the data to LER 211. Thus, routes on the two parallel IP networks 230-1, 230-2 are selected in this example using multipath routing techniques and data is evenly distributed over each network 230-1, 230-2.

Also as illustrated in FIG. 14A, the switch control interfaces 220-1, 220-2 represent that the LSCs 201-1, 201-2 are not using resources from the other respective switch resource partitions 240-1, 240-2. That is, LSC 201-1 uses resources 240-1, while LSC 201-2 uses resources 240-2. The data switch resource management process 250 (not specifically shown in this figure) permits and controls sharing of resources between the partitions 240, as shown by a double headed arrow 252 in this example.

In FIG. 14B, an LSC failure is illustrated by the "X" through the LSC 201-1. When LSC 201-1 fails, the data network 230-1 is no longer fully supported. Upon such a failure, the system of the invention allows the network 230-2 supported by LSC 201-2 to handle the IP data formerly carried by network 230-1. To enable this to happen, the LERs 210, 211 (one or the other or both) will detect the failure of LSC 201-1 to participate in the routing and label distribution protocols. In response, they will deduce that data transfer on the route supported by LSC 201-2 is no longer reliable. Alternatively, other algorithms and/or techniques can be used to allow an LER 210, 211 to detect the inability of LSC 201-1 to properly route data. In any event, when an LER 210, 211 detects such a condition, it will inform other devices by routing protocols that the route/data link providing the path for network 230-1 previously supported through the LSC 201-1 is no longer available. Depending on the routing protocol, the routing protocol might represent the failure of the links (i.e., of the routes to ports 225-0 through 225-3 of network 230-1) by increasing their weight or cost metric to infinity, for example, as illustrated in the FIG. 14B. Alternatively, the routing protocol can represent more directly that the links (e.g., 230-1-1) are no longer in existence or available for use. By way of example, OSPF can simply indicate that the links are not existent.

In any event, the weight or cost of port 225-4 at remains at one (1W). Generally, in multipath routing, a lower cost is favored over a higher cost. Either as a result of the cost adjustment, or from simply detecting the failed link supporting network 230-1, subsequent data transmitted from LER 210 through LSR 200 (to a destination requiring the data to pass through LSR 200, such as to LER 211) will be sent over network link 230-2-1, instead of over the failed network link 230-1-1. As a result of the increased load in data transfer over network 230-2 and the increased routing and data handling requirements on routes supported by LSC 201-2 (due to multipath routing at the LERs 210, 211 preferring network 230-2 over failed network 230-1), and as a result of a decreased load due to the failed LSC 201-1, switch resources such as bandwidth, queues, memory and processing will be released by LSC 201-1 and will be consumed by LSC 201-2. This is illustrated in FIG. 14B by showing that the data of network 230-1 which previously flowed through ports 225-0 through 225-3 now passes from port 225-4 in the LER 210 to ports 225-4 through 225-7 (i.e., now passes over the same connections as network 230-2). This is further illustrated by arrow 252 that shows the data switch resource management process 250 directing all switch resources from partition 240-1 (formerly used by the failed LSC 201-1) to partition 240-2, in support of the additional, data loads experienced on network 230-2.

It is to be understood that the design of the system of the invention does not require that the LSC 201-2 obtain any special connection or state information from the failed LSC 201-1. This is because in the example described embodiment, both LSCs 201-1 and 201-2 are configured to operate concurrently in parallel using multipath routing, and each maintains concurrent parallel connections and LVCs (not shown) in each partition 240. Under normal operating conditions, two identically configured LSCs 201-1 and 201-2 share the load of data transfer by providing equivalent cost parallel data networks 230-1, 230-2. In the event of a failure of one LSC (e.g., 201-1), the LERs 210, 211 can adjust the costs of the links supported by the networks (e.g., shown within ports 225) or otherwise indicate link failure such that that failed network (230-1 in this example, supporting link 230-1-1) is not used. Since the connections, LVCs, and routing and connection state information is already existent in the network 230-2 (as partition 240-2) maintained by the LSC 201-2, and this network 230-2 of connections now receives the data formerly sent on the failed network (230-1 in FIG. 14A), no alteration of the LSC 201-2 is required. The LVCs in the partition 240-2 established by LSC 201-2 simply handle more data (e.g., labeled cells representing IP packets) as the LERs 210, 211 now prefer the paths provided by the network 230-2. The increased data load may require more switch resources, which the data switch management process 250 makes available (arrow 252 from partition 240-1 to partition 240-2) since the failed LSC no longer requires these resources.

Note that the VSI-Slaves 241 can interact with the data switch resource management process 250 (FIGS. 9 and 10) to transfer access to the certain spare resources from one partition 240-1 to the other 240-2. For example, when the VSI-Slave processes 241 for ports 225 detect a loss of communication with a failed LSC 201-1, an LSC failure can be assumed. As such, the VSI-Slaves 241 can release the resources allocated to the partition 240-1 under control of the failed VSI-Master 232-1 within the failed LSC 201-1. For some switch resources, such as port bandwidth, the resource may be made available to the connections under the control of LSC 201-2 immediately and without intervention of LSC 201-1 or any VSI-Slave processes 241. In this way, the LSCs 201 can operate completely independently of each other, even to the extent that failure of one LSC 201 causes little or no work or change of state in LSC 201-2.

LSC Failover Using Unipath Routing

FIGS. 15A and 15B illustrate the failure of an LSC 201 in much the same manner as explained above. However, in this example, a unipath routing protocol is used to distribute the data over a routes supported by the LSCs 201. In operation, the LERs 210, 211 initially select the route offered by LSC 201-1 for data transfers using a unipath routing algorithm. In this condition, the LSC 201-2 is still active and is configured to offer a route parallel to the selected route (i.e., LSC 201-2 offers a route through ports 225-5 and 225-6). However, this second route is unused because the routing algorithm uses only one route at a time and all data transfers take place using the selected route of LSC 201-1.

If the LSC 201-1 fails, as illustrated in FIG. 15B, the LERs 210, 211 senses the failure as explained above with respect to FIG. 14B. The LERs 210, 211 then re-analyze the network for other available routes, at which point they detect and select the route offered by LSC 201-2. Upon selection of this route via the routing protocol, the LSC 201-2, instructs the VSI-Slave processes 241 operating with the data switching mechanism 205 to install the proper connections required to support this route. In this example, a path is established for data transfers from ports 225-4 through 225-7 and data transfers can commence thereafter. Any resources of the switch partition 240-1 are reallocated as explained above (with respect to FIG. 14B) either by the VSI-Slave processes 241 or by the data switch resource management process 250, as indicated by the arrow from 240-1 to 240-2 in FIG. 15B.

The former examples have been somewhat simplified for ease of description of the invention in that they use a network topology where there is only one source and one destination and thus only one route is active. It is to be understood that in a more typical configuration, there are many sources and destinations and many routes in use at any one point in time. In the case of the unipath implementation, only one route is used per destination, but since many destinations exist that each receive a stream of data, many routes are supported. As such, unipath implementations may still use both networks 230 and both partitions 240 at once, but for routes to different destinations. In the event of an LSC failure, the failed routes would then be handled as previously explained by parallel routes provided by the non-failed LSC.

Network Topologies Provided by the Invention

FIG. 16 illustrates how a combination of successively linked LSRs 200-1 through 200-P that are configured according to the invention can be used to provide multiple parallel IP networks 230-1 through 230-N offering the LSC redundancy features of the invention, as explained above. In this figure, each LSR 200 is configured with a plurality of LSCs 201-1 through 201-N that are associated with respective switch resource partitions 240-1 through 240-N. As such, each LSC 201 and partition 204 pair provides the capability to support a route for a separate parallel network 230 in conjunction with respective other LSCs 201 and partitions 240 in other LSRs 200. If each LSR 200 has N LSC partition pairs 201, 240, N parallel data networks may be supported.

Under normal operation, the LERs 210, 211 use multipath routing to distribute a portion of traffic onto each supported IP data network 230-1 through 230-N (i.e., each route supported by one or more LSCs in a series) to provide multiple parallel paths that may be taken for data transferred between the LERs 210 and 211. In the event of a failure of one or more LSCs 201 (as explained above), the entire network 230 containing the failed LSC 201 will not be used, as explained above. Since each network 230-1 through 230-N is configured in a similar manner, implementations of the invention that use multipath routing can balance the distribution of data between the remaining functioning networks 230, while the failed network is excluded. Implementations that use unipath routing can simply select another parallel network 230 to support data transfers. In either case, LSC reconfiguration is not required.

FIGS. 17A and 17B illustrate how a network of circuit-switched data communications devices configured according to the invention provides redundant concurrently operating routable parallel networks within a connection-based network environment. In FIG. 17A, data links 229 represent one or more physical links. This example configuration consists of three label edge routers 210, 211 and 212 coupled to two ATM switches 205-1, 205-2. Each ATM switch 205-1, 205-2 is equipped with two LSCs 201-1, 201-2 (for switch 205-1) and 201-1A, 201-2A (for switch 205-2). The ATM switches 205 combined with the LSCs 201 form LSRs (not labeled as such) that operate as explained above. As such, parallel communication routes 230 are supported within the ATM network, with each LSC 201 supporting a separate and concurrently route over the same or different physical data links 229 (depending on the use of the fully-meshed or fully parallel configuration).

FIG. 17B illustrates an example of some of the various networks 230 (network routes) that can be supported using the network architecture shown in FIG. 17A. In FIG. 17B, the individual LSCs 201 paired with their respective switch resource partitions 240 are shown as separate network nodes since each pair supports a distinct network 230. As indicated, networks 230-1 and 230-2 are parallel networks each supported by respective LSCs (201-1, 201-1A for network 230-1, and 201-2, 201-2A for network 230-2). The networks 230-1 and 230-2 are parallel networks, each supporting similar routes.

FIG. 17B also illustrates an alternative configuration of the invention that also provides alternative routes 230-3, 230-4. As illustrated, network paths 230-3 and 230-4 represent data paths that may be used when an LSC fails. For instance, if LSC 201-1A fails, the LSC1 201-1 may be equipped, in one embodiment of the invention, to select a data route (using multipath routing techniques) to the port corresponding to network 230-3. In other words, though the embodiment of the invention discussed above allows the LERs 210, 211 to select routes, this example embodiment providing network paths 230-3, 230-4 allows the LSCs 201 to also provide route selection capability via an implementation of multipath routing. In the case of failure of LSC 201-1A, network path 230-3 is selected by LSC 201-1 which causes LSC 201-2A to handle all data transfers (data for network 230-2, as well as data formerly routed on network 230-1 through the failed LSC 201-1 A). The re-routing of data by LSC 201-1 to avoid the failed LSC 201-1A can be performed by the mechanisms discussed above with respect to other implementations, in conjunction with multipath routing techniques. That is, in this example alternative, each LSC 201 may be equipped with the ability to chose amongst different network paths.

This is to be contrasted with the embodiment in FIG. 16 in which only the LERs 210, 211 chose network paths (i.e., routes). Thus, while the embodiment in FIG. 16 allows the LERs 210, 211 to control distribution of data between the parallel networks 230-1 through 230-N formed from one or more LSCs 201 in series, other alternative embodiments of the system and architecture of the invention allow each LSR 200 (each ATM switch 205 coupled with a plurality of LSCs 201) to, have LSCs 201 equipped with multipath routing selection techniques that allow the LSRs themselves to distribute traffic across alternate paths. In this manner, each LSC 201 in FIG. 17B can detect a failure of a neighboring LSC 201 (via failure detection mechanism previously described or equivalents thereof) and can re-route data to paths controlled by a correctly functioning LSC 201 using the techniques explained herein. Thus, the embodiment of the invention illustrated in FIG. 17B partially removes the burden of choosing alternate paths (in the event of LSC failures) from the LERS 210, 211. This embodiment of the invention also allows rerouting around failed LSCs and maximizes the use of data paths controlled by non-failed LSCs.

General Label Edge Router Operation

FIG. 18 shows the processing steps 501 through 506 which are generally performed within a label edge router (e.g., within LERs 210, 211 in FIG. 6) according to general embodiments of the invention to establish and configure a plurality of redundant concurrently operating parallel networks. The operation will be explained both in the context of multipath routing and unipath routing.

In a typical configuration of inter-networked LSRs 200, each LSR has a common number of LSCs 201, with a typical number being two, and each LSC 201 is of the same type and is configured in a similar manner to offer the same routes in parallel with each other. In step 501, the LERs 210, 211 analyze the details of the network topology using a routing protocol (e.g., a unipath or a multipath routing protocol) to find out that there a number of paths (e.g. routes offered by the LSCs 201). Since there are N LSCs 201 in an LSR 200 which are all participating in the routing protocol, there will be at least N viable routes through the LSR to each destination. Preferably, the paths of interest are the set of lowest cost routes, though multipath routing protocols do allow data to be distributed over routes of different costs. In any event, in this example, step 501 determines the available paths and costs.

Also depending upon the type of routing protocol used within the network LERs 210, 111, either step 502-1 or 502-2 is then performed. If using a multipath routing protocol, the LERs 210, 211 perform step 502-1 to configure N networks across the switched network, with each network supported by (i.e., selected according to) one of the equal lowest cost routes offered by a respective LSC 201. If the LERs 210, 211 perform step 502-1 using multipath routing, then step 503 is also performed in which the LERs 210, 211 begin transmitting data across the switch network by dividing the data amongst the N networks 230 according to the multipath routing protocol distribution. If a unipath routing protocol is used within the networked LERs 210, 211, then step 502-2 is instead performed after step 501, in which case the LERs 210, 211 select one route from the plurality of parallel routes offered by the various LSCs 201 to each destination. For each destination, the selected network route is supported by a respective LSC 201 offering the selected route within each switch on a path to a destination. Generally then, the routes taken to the many destinations may happen to use any or even all of the N LSCs, so N network may be configured each serving one or more different destinations. The N networks when active may not be identical since different routes are used to reach different destinations, though duplicate or parallel routes are available which were not selected for each destination. Then step 503-2 is performed wherein the LERs 210, 211 begin transmitting data across the switched network using the selected route to each destination.

At this point in processing, each LSC 201 supports a distinct set of routes (with a plurality of routes being selected for each destination for concurrent use in the multipath routing with potentially many destinations, or only one route per destination being used at a time in the unipath routing case for many potential destinations). Preferably, the routes support individual IP data networks operating within an ATM or Frame Relay switched network.

Steps 504 through 506 allow failures to occur in the LSCs 201 without significantly debilitating the overall throughput of data. The LERs 210, 211 perform the general processing as follows: In step 504, the LERs 210, 211 detect a failure of a network 230 by using one or more link/port failure, routing failure, LDP failure, LSC failure, handshake failure, or other failure detection protocol, mechanisms or techniques or some equivalent thereof. If an LER 210, 211 detects a failure of an LSC 201, in step 505, the LERs 210, 211 re-analyze the network again to determine the current set of available non-failed equivalent routes. Depending upon the routing protocol in use, these may be the lowest cost routes, or a combination of different cost routes. Preferably, the set of minimum cost routes is determined in step 505.

Next, depending upon the routing protocol in use, the LERs 210, 211 perform step 506-1 for multipath routing or step 506-2 for unipath routing. In step 506-1, the LER 210, 211 uses multipath routing techniques to distribute the data over the remaining networks 230. The failed routes supported by the failed LSC 201 receive no data as these routes are excluded from the selection process in step 505 using the techniques discussed above. As such, the failed path of the network is not used for data transmission. If a unipath routing protocol is in use on the LERs 210, 211, the in step 506-2, the LERs 210, 211 select, for each destination which was using a route through the failed part of the network, a route from the remaining set of routes determined in step 505. Data transmission is then enabled along the newly selected routes. This is performed by the label distribution protocol which sends signaling messages to the LSCs 201 along the new route, causing the LSCs to establish a data connection in the switch along the path of the new route.

In this manner, the LER processing of FIG. 18 can detect failures of LSCs and can re-route data using other network paths supported by the other redundant LSCs on the same set of switches, without having to fully reconfigure each LSC from the ground up. This allows LSC failures to occur, especially in the case of multipath routing implementations, without significant effects on performance. It can be the case that no data is lost and negligible performance degradations are experienced when using the architecture of the invention to provide LSC redundancy.

General Label Switch Router Operation

FIG. 19 shows the general processing steps performed by an LSR 200 configured according to either the fully-meshed or fully-parallel embodiments of the invention. For the fully-parallel configuration, step 520-A is performed. In step 520-A, the LSR 200 configures, for each of the N LSCs 201, 1/Nth of the ports in the data switching mechanism 205 with a respective LSC as a master controller. That is, the ports 225 are grouped for the number of LSCs 201, and each group gets assigned a respective LSC 201. For the fully-meshed configuration, in step 520-B, the LSR 200 partitions 1/Nth of each port's bandwidth or resources and assigns each 1/Nth portion to a respective LSC 201, of the N LSCs 201.

Once the assignment of ports (or portions of bandwidth thereof for the fully-meshed configuration) is made to the LSCs 201 in step 520, in step 521, the LSR 200 in step 521 advertises routes and establishes connections for selected routes in the form of labeled virtual circuits (LVCs) for each respective port or partition thereof assigned to each LSC 201, for any routes through this LSR 200 selected via operation of the routing protocol process (e.g., 352-1, 352-2 in FIGS. 12 and 13) executing within the LSCs 201 in conjunction with the LERs 210, 211. In other words, for all selected routes (one to each destination requiring a path through this LSR 200 for unipath routing, or one or more route for each destination requiring a path through this LSR 200 for multipath routing) each LSC supporting a route establishes connections in the data switching mechanism 205 to provide a data path for the route. At this point, if a multipath routing protocol has been used to selected multiple routes to be "active" in this LSR 200 at the same time, then parallel networks are supported by the LSCs 201.

In step 522, the LSR 200 begins to transport data for each connection (i.e., each network 230 begins handling data). In step 522, each LSC 201 in the LSR 200 uses resources assigned to it, or as needed, within its switch resource partition 240 to handle the routes of labeled data that pass through the switch mechanism 205 (e.g., labeled cells in an ATM switch). If only one route through this LSR 200 was selected by the LERs 210, 211 using a unipath routing protocol, then the data transport operation performed by the switching mechanism 205 in step 522 has access to most of the resource of the switch, whereas if multiple routes are selected, then switch resources are preferably dynamically shared between partitions via the data switch resource management process 250 (e.g., FIGS. 9 and 10).

In step 523, in the event that the LSR experiences a failure of one of the LSCs 201, the resources of the failed LSC 201 are made available for use by other still functioning LSCs 201 as described above. For example, when a VSI-Slave process 241 loses communication with it's VSI-Master process 232, the VSI-Slave 241 can release its resources by deducing that the LSC has failed. Since each LSC 201 is configured in step 520 with similar networks and routing information, the LSCs 201 do not need to obtain connection state information from the failed LSC. Rather, as indicated in the LER processing in FIG. 18, in event of a failure, the failed network path 230 will be excluded from further data transfers and one or more other networks 230 will be used. If using a multipath routing protocol, the LVCs controlled by each LSC 201 that remain in a properly operating state will experience a slightly increased load and will use somewhat more resources 240 to handle the data formerly transferred by LVCs controlled by the failed LSC. Unipath routing will simply allow other routes from other LSCs to handle all data transfers. In either case, the switch resources are available since the failed LSC no longer requires them.

As described in detail above, the system and architecture of the invention provides a high degree of redundancy and reliability in a network of connection-based devices that are configured to use label switching technology. Such configurations can be reliable enough for voice applications requiring guaranteed levels of service and no down time.

While this invention has been particularly shown and described with references to preferred embodiments thereof, it will be understood by those skilled in the art that various changes in form and details may be made therein without departing from the spirit and scope of the invention as defined by the appended claims.

APPENDIX A

The following documents and web pages are hereby incorporated by reference in their entirety, as well as documents related to MPLS and label switching that may be referenced on such pages. The contents of the pages are included in the file history of this patent for future reference.

1. "A Framework for Multi-Protocol Label Switching", authored Jun. 24, 1999, which is an Internet Draft of Request For Comment 2026 (RFC2026) maintained on the Internet at URL http://www.ietf.org/internet-drafts/draft-ietf-mpls-framework-03.txt ) by the Internet Engineering Task Force (IETF).
2. World Wide Web Page entitled "Multiprotocol Label Switching (mpls)", last modified Jul. 06, 1999, maintained on the Internet at URL http://www.ietf.org/html.charters/mpls-charter.html by the Internet Engineering Task Force (IETF).
3. World Wide Web Page entitled "Tag Switching Architecture", maintained on the Internet at URL http://www.cisco.com/warp/public/732/tag/tagsw_ov.htm by Cisco Systems, Inc.
4. World Wide Web Page entitled "Tag Switching:Uniting Routing and Switching for Scalable, High-Performance Services", maintained on the Internet at URL http://www.cisco.com/warp/public/cc/cisco/mkt/ios/tag/tech/tagsw_wp.htm by Cisco Systems, Inc.
5. World Wide Web Page entitled "Tag Switching:EMPOWERING THE ERA OF THE INTERNET AND INTRANETS", maintained on the Internet at URL http://www.cisco.com/warp/public/732/tag/index.htm by Cisco Systems, Inc. by Cisco Systems, Inc.

What is claimed is:

1. A data communications device comprising:
a data switch mechanism, the data switch mechanism including:
  i) at least one port for receiving data;
  ii) at least one port for transmitting data;
  iii) data switch resources for receiving data and transmitting data; and
a plurality of switch control mechanisms coupled to the data switching mechanism,
wherein the data switch resources are distributed into a plurality of partitions, each partition providing resources for concurrently and independently supporting at least one respective data route between the at least one port for receiving data and the at least one port for transmitting data, and each of the plurality of partitions including an interface allowing that partition to be concurrently and independently controlled by a respective switch control mechanism and each of the plurality of switch control mechanisms couples to the data switching mechanism via a respective interface of a partition and each concurrently and independently operates according to at least one connection routing protocol to advertise a respective route for data through the respective partition of the data switch resources.

2. The data communications device of claim 1 wherein:
the plurality of partitions of the data switch resources includes a first partition and a second partition;
the plurality of switch control mechanisms includes first and second switch control mechanisms; and
wherein the first switch control mechanism controls data switch resources in the first partition according to a first connection routing protocol to provide a first route for data through the first partition; and
wherein the second switch control mechanism controls data switch resources in the second partition according to a second connection routing protocol to provide a second route for data through the second partition.

3. The data communications device of claim 2 wherein:
the first and second connection routing protocols are configured in parallel to offer the same routes, such that the first and second routes provided through the first and second partitions are parallel routes.

4. The data communications device of claim 3 wherein:
the first route provided within the first partition is established as a corresponding first switched connection;
the second route provided within the second partition is established as a corresponding second switched connection; and
wherein the first and second switched connections handle data transfers concurrently and according to a multipath routing protocol that distributes data between the first and second routes, such that the first and second switch control mechanisms support routes for distinct parallel networks that operate to transfer data concurrently through the data communications device.

5. The data communications device of claim 4, further including:
means for detecting an inability of the first switch control mechanism to support the first route within the first partition;
means, in response for the means for detecting, for re-routing a data stream transferred using the first route within the first partition to the second route within the second partition.

6. The data communications device of claim 5, further including:
means, in response to the means for detecting, for de-allocating data switch resources from the first partition used to support the first connection; and
means, in response for the means for de-allocating, for allocating at least a portion of the data switch resources de-allocated from the first partition to the second partition, such that the portion of data switch resources that are de-allocated from the first partition are allocated to the second partition in order to support data transfers on the second route provided by the second connection.

7. The data communications device of claim 2 wherein:
the first route provided within the first partition is established as a corresponding first switched connection;
the second route provided within the second partition has no corresponding second switched connection in the second partition; and wherein the first switched connection handles data transfers according to a unipath routing protocol that initially selects the first route to perform data transfers, such that the first and second switch control mechanisms each support routes for distinct parallel networks, but that only one of such routes is selected according to the unipath routing protocol to initially transfer data through the data communications device.

8. The data communications device of claim 7, further comprising:

means for detecting an inability of the first switch control mechanism to support the first route within the first partition; and means, in response to the means for detecting, to establish a second connection in the second partition according to the second route supported by the second switch control mechanism, the second connection used to provide data transfers of a stream of data formerly transferred through the first connection.

9. The data communications device of claim 8, further comprising:

means for de-allocating data switch resources from the first partition used to support the first connection, and means for removing the first connection from the first partition; and means, in response for the means for de-allocating, for allocating the data switch resources de-allocated from the first partition to the second partition, such that the data switch resources that are de-allocated from the first partition are allocated to the second partition in order to support data transfers on the second route provided by the second connection.

10. The data communications device of claim 1 wherein:

the at least one input port and the at least one output port are comprised of a plurality of ports on the data communications device, and wherein each port may serve as both an input and an output port; and wherein each of the plurality of partitions has access to a portion of an amount of bandwidth on each of the plurality of ports, such that the at least one respective data connection supported by each partition shares a total amount of bandwidth available on at least one port of the plurality of ports.

11. The data communications device of claim 1 wherein:

the at least one input port and the at least one output port are comprised of a plurality of ports on the data communications device, and wherein each port may serve as both an input and an output port; and wherein each of the plurality of partitions has access to a total amount of bandwidth on a respective and exclusive set of ports selected from the plurality of ports, such that data connections maintained within each partition are transferred using the ports assigned to that partition and no others.

12. The data communications device of claim 1, wherein the data switching mechanism includes a plurality of slave processes, each slave process responsible for controlling resources associated with at least one respective port of the data communications device, and each slave process communicating with at least two of the plurality of switch control mechanisms to receive routing information concerning a route concurrently supported by each of the switch control mechanisms with which the slave process communicates.

13. A data communications device comprising:

a plurality of switch control mechanisms, each operating a respective connection routing protocol, each of the plurality of switch control mechanisms has an associated resource partition of data switch resources within a data switching mechanism;

the data switching mechanism having a coupling to each of the plurality of switch control mechanisms;

wherein each of the plurality of switch control mechanisms independently and concurrently supports a route through the data switching mechanism according to the respective connection routing protocol operated by the switch control mechanism using resources from an partition of resources assigned to that switch control mechanism and if data switch resources in one of the resource partitions associated with a switch control mechanism becomes unavailable, the data transferred by the route supported by the switch control mechanism using that resource partition is re-routed to be supported by at least one another resource partition providing another parallel route assigned to another of the plurality of switch control mechanisms.

14. A data communications device comprising:

a plurality of switch control mechanisms, each operating a respective connection routing protocol;

a data switching mechanism having a coupling to each of the plurality of switch control mechanisms;

wherein each of the plurality of switch control mechanisms independently and concurrently supports a route through the data switching mechanism according to the respective connection routing protocol operated by the switch control mechanism using resources from a partition of resources assigned to that switch control mechanism, and wherein the respective connection routing protocols operating on at least two of the plurality of switch control mechanisms are the same connection routing protocols and are configured to support routes that are the same, such that parallel network routes are provided for selection through the data communications device by each of the at least two of the plurality of switch control mechanism that operate the same connection routing protocol, respectively.

15. A data communications device comprising:

a plurality of switch control mechanisms, each operating a respective connection routing protocol;

a data switching mechanism having a coupling to each of the plurality of switch control mechanisms;

wherein each of the plurality of switch control mechanisms independently and concurrently supports a route through the data switching mechanism according to the respective connection routing protocol operated by the switch control mechanism using resources from a partition of resources assigned to that switch control mechanism, and wherein the data switching mechanism is an ATM switch and at least two of the plurality of switch control mechanisms are label switch controllers that operate at least one Internet Routing Protocol and at least one label distribution protocol according to multi-protocol label switching technology in order to concurrently route at least two streams of labeled ATM cells passing through the ATM switch at the same time.

16. The data communications device of claim 13 wherein:

when one of the switch control mechanisms fails to operate correctly, data transferred using the route supported by the switch control mechanism that fails is subsequently transferred through the data communications device using the route supported by at least one other correctly operating switch control mechanism within the plurality of switch control mechanisms.

17. The data communications device of claim 16, wherein:

each route supported by each switch control mechanism has an associated connection established in the partition supporting that route, and wherein the connections associated with all of the routes concurrently operate according to a multipath routing protocol to transfer data through the data communications device in a parallel manner across multiple routes, and when one route fails, the connections for remaining non-failed routes continue to operate to transfer data through the data communications device.

18. The data communications device of claim 16, wherein:

one route supported by one of the switch control mechanism has an associated connection established in the partition supporting that route, and wherein the associated connection operates to transfer data through the data communications device according to a unipath routing protocol, and when the route of the associate connection fails, a connections for a remaining non-failed routes is established and operates to transfer data through the data communications device.

19. The data communications device of claim 13 wherein:

each of the plurality of switch control mechanisms has an associated resource partition of data switch resources within the data switching mechanism; and wherein if data switch resources in one of the resource partitions associated with a switch control mechanism becomes unavailable, portions of data that are currently routed through the at least one data connection supported by that resource partition are re-routed through at least one another resource partition assigned to another of the plurality of switch control mechanisms within the data communications device.

20. An Asynchronous Transfer Mode switch comprising:

a data switching mechanism for supporting data connections through the Asynchronous Transfer Mode switch;

a plurality of switch control mechanisms, each operating a similarly configured connection routing protocol and each implementing multi-protocol label switching technology to allow routing of labeled ATM cells, and each independently and concurrently controlling a respective partition of resources within the data switching mechanism to control a respective route for data through the Asynchronous Transfer Mode switch, wherein the route controlled by one of the plurality of switch control mechanisms is configured in a parallel manner to the route controlled by another one of the plurality of switch control mechanisms, thus providing a plurality of parallel network routes through the Asynchronous Transfer Mode switch.

21. The Asynchronous Transfer Mode switch of claim 20, further comprising:

means for detecting a fault condition within at least one of the plurality of switch control mechanisms in the Asynchronous Transfer Mode switch; and means, responsive to the means for detecting, for re-routing data formerly transferred on a connection associated with a route provided by the at least one of the plurality of switch control mechanisms containing the detected fault condition by using a connection associated with a route provided by another of the at least one of the plurality of switch control mechanisms that does not contain a fault condition.

22. The Asynchronous Transfer Mode switch of claim 21, further comprising:

means, responsive to the means for detecting, for releasing resources controlled by the at least one switch control mechanism that faulted; and means, responsive to the means for releasing, for allowing the another one of the at least one of the plurality of switch control mechanisms that does not contain a fault condition to obtain control of the released resources, such that data formerly transferred using the route maintained by the switch control mechanism that faulted is now transferred by the another connection associated with a route controlled by one of the at least one of the plurality of switch control mechanisms that obtains control of the released resources.

23. A method for transferring data through a data communications device, the method comprising the steps of:

configuring a plurality of parallel routes through a switched network device, each route supported by a respective switch control mechanism interfaced to the data communications device, wherein each respective switch control mechanism is of the same type and is configured with the same connection routing protocol; and transferring a plurality of portions of data that are bound for the same destination through the data communications device by selecting, according to a routing protocol, at least one of the routes supported by at least one of the switch control mechanism and transmitting portions of data using a connection established for the selected route.

24. The method of claim 23, wherein the step of configuring a plurality of parallel routes through the data communications device further comprises the steps of:

analyzing routing information maintained within the data communications device to determine a set of available parallel routes provided by each of the respective switch control mechanisms;

configuring at least one network through the data communications device by selecting at least one route supported by a switch control mechanism within the data communications device for data transfers; and establishing the connection within the data communications device according to the selected at least one route.

25. The method of claim 23, further including the steps of:

detecting a failure of one of the at least one of the routes supported by a switch control mechanism that is used to perform data transfers through the data communications device;

re-analyzing the data communications device to determine a new set of available parallel routes provided by at least one switch control mechanism that is operating properly;

transferring a plurality of portions of data that are bound for the same destination through the data communications device by selecting, according to the routing protocol, at least one route from the new set of available parallel routes.

26. The method of claim 23, wherein the routing protocol is a multipath routing protocol and the at least one route initially selected for the transmission of data is a plurality of parallel routes, each supported by a respective switch control mechanism and wherein the at least one route selected from the new set of available routes is the set of lowest cost routes supported by properly operating switch control mechanism and excludes the route containing the detected failure.

27. The method of claim 23, wherein the routing protocol is a unipath routing protocol and the at least one route initially selected for the transmission of data is a single route of the plurality of parallel routes, and wherein the at least one route selected from the new set of available routes is another route supported by another properly operating switch control mechanism that is different from the route containing the detected failure.

28. The method of claim 23, wherein the second step of transferring is performed without having to transfer state information from a failed switch control mechanism to the at least one switch control mechanism supporting the at least one newly selected route.

29. A method of transferring data through a data communications device, the method comprising the steps of:
   configuring partitions of resources of a data switching mechanism equally and respectively among a plurality of switch control mechanisms;
   configuring each switch control mechanism to independently and concurrently operate a connection routing protocol;
   transferring data through the data communications device by having each switch control mechanism support a route according to operation of a respective connection routing protocol, the routes causing a connection to be formed in the partition of resources configured for that respective switch control mechanism; and
   wherein the resources in each partition are configured to provide data transfer connections capable of transferring data from one port to another in the data communications device, and wherein the connections of at least one partition are configured in parallel to the connections of at least one other partition, such that the at least one partition and the at least one other partition transfer data in from a source to a destination in a parallel manner, and such that if one switch control mechanism fails, connection provided by routes supported by remaining switch control mechanism will remain active to continue to transfer data.

30. A computer program product having a computer-readable medium including computer program logic encoded thereon for transferring data through a data communications device, such that the computer program logic, when executed on at least one processing unit with the data communications device, causes the at least one processing unit to perform the steps of:
   configuring a plurality of parallel routes through a switched network device, each route supported by a respective switch control mechanism interfaced to the data communications device, wherein each respective switch control mechanism is of the same type and is configured with the same connection routing protocol; and
   transferring a plurality of portions of data that are bound for the same destination through the data communications device by selecting, according to a routing protocol, at least one of the routes supported by at least one of the switch control mechanism and transmitting portions of data using a connection established for the selected route.

31. The computer program product of claim 30, wherein the computer program logic, when executed on the at least one processing unit to perform the operation of configuring a plurality of parallel routes through the data communications device, further causes the processor to perform the steps of:
   analyzing routing information maintained within the data communications device to determine a set of available parallel routes provided by each of the respective switch control mechanisms;
   configuring at least one network through the data communications device by selecting at least one route supported by a switch control mechanism within the data communications device for data transfers; and
   establishing the connection within the data communications device according to the selected at least one route.

32. The computer program product of claim 30, wherein the computer program logic, when executed on the at least one processing unit, further causes the processor to perform the steps of:
   detecting a failure of one of the at least one of the routes supported by a switch control mechanism that is used to perform data transfers through the data communications device;
   re-analyzing the data communications device to determine a new set of available parallel routes provided by at least one switch control mechanism that is operating properly;
   transferring a plurality of portions of data that are bound for the same destination through the data communications device by selecting, according to the routing protocol, at least one route from the new set of available parallel routes.

33. A computer program product having a computer-readable medium including computer program logic encoded thereon for transferring data through a data communications device, such that the computer program logic, when executed on at least one processing unit with the data communications device, causes the at least one processing unit to perform the steps of:
   configuring partitions of resources of a data switching mechanism equally and respectively among a plurality of switch control mechanisms;
   configuring each switch control mechanism to independently and concurrently operate a connection routing protocol;
   transferring data through the data communications device by having each switch control mechanism support a route according to operation of a respective connection routing protocol, the routes causing a connection to be formed in the partition of resources configured for that respective switch control mechanism; and
   wherein the resources in each partition are configured to provide data transfer connections capable of transferring data from one port to another in the data communications device, and wherein the connections of at least one partition are configured in parallel to the connections of at least one other partition, such that the at least one partition and the at least one other partition transfer data in from a source to a destination in a parallel manner, and such that if one switch control mechanism fails, connection provided by routes supported by remaining switch control mechanism will remain active to continue to transfer data.

* * * * *

UNITED STATES PATENT AND TRADEMARK OFFICE
CERTIFICATE OF CORRECTION

PATENT NO.    : 6,628,649 B1
DATED         : September 30, 2003
INVENTOR(S)   : Alex E. Raj et al.

It is certified that error appears in the above-identified patent and that said Letters Patent is hereby corrected as shown below:

Column 38,
Line 4, "the data switching mechanism" shoud read -- a data switching mechanism --.

Signed and Sealed this

Eighteenth Day of May, 2004

JON W. DUDAS
*Acting Director of the United States Patent and Trademark Office*